United States Patent
Kiyanagi

(10) Patent No.: US 6,731,704 B1
(45) Date of Patent: May 4, 2004

(54) APPARATUS AND BIT-SHIFT METHOD FOR ELIMINATING INTERFERENCE OF CROSS POLARIZATION

(75) Inventor: Hiroyuki Kiyanagi, Sendai (JP)

(73) Assignee: Fujitsu Limited, Kawasaki (JP)

( * ) Notice: Subject to any disclaimer, the term of this patent is extended or adjusted under 35 U.S.C. 154(b) by 565 days.

(21) Appl. No.: 09/584,946

(22) Filed: Jun. 1, 2000

(30) Foreign Application Priority Data

Aug. 20, 1999 (JP) .......................................... 11-234784

(51) Int. Cl.7 ................................................. H04B 1/10
(52) U.S. Cl. ....................... 375/346; 375/148; 375/349; 455/296; 329/320
(58) Field of Search ................................. 375/346, 340, 375/324, 316, 349, 148; 455/296, 295; 329/316, 318, 320

(56) References Cited

U.S. PATENT DOCUMENTS

| | | | | |
|---|---|---|---|---|
| 4,910,468 A | * | 3/1990 | Ohtsuka et al. | 329/316 |
| 5,383,224 A | * | 1/1995 | Mizoguchi | 365/346 |
| 5,838,740 A | * | 11/1998 | Kallman et al. | 375/346 |

FOREIGN PATENT DOCUMENTS

| | | |
|---|---|---|
| JP | 59-139739 | 8/1984 |
| JP | 9-51296 | 2/1997 |
| JP | 9-214461 | 8/1997 |
| JP | 9-270764 | 10/1997 |

* cited by examiner

*Primary Examiner*—Temesghen Ghebretinsae
(74) *Attorney, Agent, or Firm*—Katten Muchin Zavis Rosenman

(57) ABSTRACT

In a cross polarization interference eliminating apparatus, a signal demodulating section receives a first signal resulting from one of radio signals, which are transmitted in a modulated, decoded and equalized form from respectively using two kinds of polarized plain waves intercrossing at right angles in a common frequency band, and analog-to-digital converts, demodulates and equalizes the received first signal to output a first baseband signal, and an interference eliminating section receives a second signal resulting from the other radio signal, analog-to-digital converts the received digital signal to obtain a digital signal, delays the obtained digital signal. And an adding section adds the second baseband signal from the interference eliminator to the first baseband signal from the signal demodulator to output a composite signal. With this arrangement, it is possible to vary the amount of delay without a cell breathing and in accordance with the change of environment, such as temperature, without requiring the manipulation by an operator even during operation of the system. The apparatus can be compact in size and can be stabilized in operation without making an adjustment.

6 Claims, 14 Drawing Sheets

FIG. 7

CONT SIGNAL IS FIXED BY H

| | | 1 | 2 | 3 | 4 | 5 | 6 | 7 | 8 | 9 | 10 | 11 | 12 |
|---|---|---|---|---|---|---|---|---|---|---|---|---|---|
| CLOCKS AND INPUT SIGNAL | 4FCLK | ↑ | ↑ | ↑ | ↑ | ↑ | ↑ | ↑ | ↑ | ↑ | ↑ | ↑ | ↑ |
| | CONT SIGNAL | H | H | H | H | H | H | H | H | H | H | H | H |
| | FCK | ↑ | | | | ↑ | | | | ↑ | | | |
| | XPICCK | ↑ | | | | ↑ | | | | ↑ | | | |
| | 4FDATA | A1 | A2 | A3 | A4 | B1 | B2 | B3 | B4 | C1 | C2 | C3 | C4 |
| DECODE OPERATION | DECODE OUT1 | H | L | L | L | H | L | L | L | H | L | L | L |
| | DECODE OUT2 | L | H | L | L | L | H | L | L | L | H | L | L |
| | DECODE OUT3 | L | L | H | L | L | L | H | L | L | L | H | L |
| | DECODE OUT4 | L | L | L | H | L | L | L | H | L | L | L | H |
| 4FCLK OPERATION | FF1 OUT1 | A1 | A1 | A1 | A1 | B1 | B1 | B1 | B1 | C1 | C1 | C1 | C1 |
| | FF1 OUT2 | | A2 | A2 | A2 | A2 | B2 | B2 | B2 | B2 | C2 | C2 | C2 |
| | FF1 OUT3 | | | A3 | A3 | A3 | A3 | B3 | B3 | B3 | B3 | C3 | C3 |
| | FF1 OUT4 | | | | A4 | A4 | A4 | A4 | B4 | B4 | B4 | B4 | C4 |
| FCK OPERATION | FF2 OUT1 | | | | | A1 | | | | B1 | | | |
| | FF2 OUT2 | | | | | A2 | | | | B2 | | | |
| | FF2 OUT3 | | | | | A3 | | | | B3 | | | |
| | FF2 OUT4 | | | | | A4 | | | | B4 | | | |
| XPICCK OPERATION | FF3 OUT1 | | | | | | | | | A1 | | | |
| | FF3 OUT2 | | | | | | | | | A2 | | | |
| | FF3 OUT3 | | | | | | | | | A3 | | | |
| | FF3 OUT4 | | | | | | | | | A4 | | | |

| | 27 | 28 | 29 | 30 | 31 | 32 | 33 | 34 | 35 | 36 | 37 | 38 | 39 | 40 |
|---|---|---|---|---|---|---|---|---|---|---|---|---|---|---|
| | ← | ← | ← | ← | ← | ← | ← | ← | ← | ← | ← | ← | ← | ← |
| | H | H | H | H | H | H | H | H | H | H | H | H | H | H |
| | | | | | | | | | | | ← | | | |
| | G3 | G4 | H1 | H2 | H3 | H4 | I1 | I2 | I3 | I4 | J1 | J2 | J3 | J4 |
| | L | L | L | L | L | L | L | L | L | L | L | L | L | L |
| | L | L | L | H | L | L | L | H | L | L | L | H | L | L |
| | H | L | L | L | H | L | L | L | H | L | L | L | H | L |
| | L | H | L | L | L | H | L | L | L | H | L | L | L | H |
| | G1 | G1 | H1 | H1 | H1 | H1 | I1 | I1 | I1 | I1 | J1 | J1 | J1 | J1 |
| | G2 | G2 | G2 | H2 | H2 | H2 | H2 | I2 | I2 | I2 | I2 | J2 | J2 | J2 |
| | G3 | G3 | F3 | F3 | H3 | H3 | H3 | H3 | I3 | I3 | I3 | I3 | J3 | J3 |
| | F4 | G4 | G4 | G4 | G4 | H4 | H4 | H4 | H4 | I4 | I4 | I4 | I4 | J4 |
| | | | G1 G2 G3 G4 | | | | H1 H2 H3 H4 | | | | I1 I2 I3 I4 | | | |
| | | | F1 F2 F3 F4 | | | | G1 G2 G3 G4 | | | | H1 H2 H3 H4 | | | |

FIG. 10

CONT SIGNAL SHOWS H AND L

| | | 1 | 2 | 3 | 4 | 5 | 6 | 7 | 8 | 9 | 10 | 11 | 12 |
|---|---|---|---|---|---|---|---|---|---|---|---|---|---|
| CLOCKS AND INPUT SIGNAL | 4FCLK | ↑ | ↑ | ↑ | ↑ | ↑ | ↑ | ↑ | ↑ | ↑ | ↑ | ↑ | ↑ |
| | CONT SIGNAL | H | H | H | H | H | H | H | L | H | H | H | L |
| | FCK | ↑ | | | | ↑ | | | | | ↑ | | |
| | XPICCK | ↑ | | | | | | | | ↑ | | | |
| | 4FDATA | A1 | A2 | A3 | A4 | B1 | B2 | B3 | B4 | C1 | C2 | C3 | C4 |
| DECODE OPERATION | DECODE OUT1 | H | L | L | L | H | L | L | L | L | L | L | L |
| | DECODE OUT2 | L | H | L | L | L | H | L | L | L | L | L | L |
| | DECODE OUT3 | L | L | H | L | L | L | H | L | L | L | L | L |
| | DECODE OUT4 | L | L | L | H | L | L | L | H | L | L | L | L |
| 4FCLK OPERATION | FF1 OUT1 | A1 | A1 | A1 | A1 | B1 | B1 | B1 | B1 | C1 | C2 | C2 | C2 |
| | FF1 OUT2 | | A2 | A2 | A2 | A2 | B2 | B2 | B2 | B2 | B2 | C3 | C4 |
| | FF1 OUT3 | | | A3 | A3 | A3 | A3 | B3 | B4 | B4 | B4 | B4 | B4 |
| | FF1 OUT4 | | | | A4 | A4 | A4 | A4 | A4 | C1 | C1 | C1 | C1 |
| FCK OPERATION | FF2 OUT1 | | | | | A1 | | | | B1 | B1 | | |
| | FF2 OUT2 | | | | | A2 | | | | B2 | B2 | | |
| | FF2 OUT3 | | | | | A3 | | | | B4 | B4 | | |
| | FF2 OUT4 | | | | | A4 | | | | C1 | C1 | | |
| XPICCK OPERATION | FF3 OUT1 | | | | | | | | | A1 | | | |
| | FF3 OUT2 | | | | | | | | | A2 | | | |
| | FF3 OUT3 | | | | | | | | | A3 | | | |
| | FF3 OUT4 | | | | | | | | | A4 | | | |

FIG. 12

| | 27 | 28 | 29 | 30 | 31 | 32 | 33 | 34 | 35 | 36 | 37 | |
|---|---|---|---|---|---|---|---|---|---|---|---|---|
| | ↑ | ↑ | ↑ | ↑ | ↑ | ↑ | ↑ | ↑ | ↑ | ↑ | ↑ | |
| | H | L | H | H | H | H | H | H | H | H | H | |
| | | | ↑ | | | | ↑ | | | | ↑ | |
| | G3 | G4 | H1 | H2 | H3 | H4 | I1 | I2 | I3 | I4 | J1 | |
| | L | L | H | L | L | L | H | L | L | L | H | |
| | L | L | L | L | L | L | L | L | L | L | L | |
| | L | L | L | L | H | L | L | H | L | L | L | |
| | H | H | L | L | L | H | L | L | H | L | L | |
| | F4 | | H1 | | H3 | | I1 | | I3 | | J1 | |
| | G1 | G1 | | H2 | | | | I2 | | I4 | | |
| | G2 | G2 | | | | | | | | | | |
| | G3 | G4 | | | | | | | | | | |
| | | F4 | F4 | | | | H1 | | | | I1 | ← FOUR BITS DELAY RESULTS |
| | | G1 | G1 | | | | H2 | | | | I2 | ORIGINAL DATA |
| | | G2 | G2 | | | | H3 | | | | I3 | |
| | | G3 | G4 | | | | H4 | | | | I4 | |
| | | E4 | E4 | | | | F4 | | | | H1 | |
| | | F1 | F1 | | | | G1 | | | | H2 | |
| | | F2 | F2 | | | | G2 | | | | H3 | |
| | | F3 | F3 | | | | G3 | | | | H4 | |

APPARATUS AND BIT-SHIFT METHOD FOR ELIMINATING INTERFERENCE OF CROSS POLARIZATION

BACKGROUND OF THE INVENTION

1. Field of the Invention

The present invention relates generally to a cross polarization interference eliminating apparatus and a bit shift method for eliminating cross polarization interference. More particularly, the invention is directed to such apparatus and bit-shift method for eliminating cross polarization interference, which are useful in a digital radio multiplex transmitting system.

2. Description of the Related Art

In recent years, for the advantage of the high efficiency of frequency use and bi-directional transmission of large amount data, an increasing number of cross polarization transmission systems have been put on the market as compared to mono-polarization transmission systems, particularly in the field of a digital multiplex radio transmission using microwaves or submillimeter waves.

The cross polarization transmitting system is a kind of radio transmission system for transmitting data using two different polarized waves as carrier waves of a common frequency. The two polarized waves are a vertical polarized plain wave and a horizontal polarized plain wave (hereinafter called the V-polarized wave and the H-polarized wave) as described below.

First, an object signal to be transmitted is modulated in a transmitting apparatus, divided into a V-polarized wave and an H-polarized wave, whereupon they are transmitted in the form of signal-1 on the V-polarized wave and signal-2 on the H-polarized wave. Namely, signal-1 is transmitted by the V-polarized wave and signal-2 is transmitted by the H-polarized wave whose frequency is identical with the frequency of the V-polarized wave. The orthogonalized V-polarized wave and H-polarized wave interfere each other when they are transmitted via radio space. Therefore, a receiving apparatus has to eliminate the interference on both the two polarized waves for preventing any loss of original data.

An apparatus for eliminating the interference is called a cross polarization interference eliminating apparatus or cross polarization compensating apparatus. This apparatus is designated in an effect to make the optimum adjustment as by shifting the sampling timing of the H-polarized wave for eliminating cross polarization interference as much as possible if interference elements from the H-polarized wave is superimposed on the V-polarized wave.

Namely, the V-polarized wave and the H-polarized wave are received in a receiving apparatus and down-converted to be inputted to cross polarization wave interference eliminating apparatuses, where the V-polarized wave and the H-polarized wave are analog-to-digital converted into and demodulated as respective desired baseband signals. The demodulated output signals are equalized in deterioration due to fading or the like in a transversal equalizer, and added in the adding section installed in a subsequent stage where they are converted into desired signal-1 and signal-2, respectively.

FIG. 14 of the accompanying drawings shows the manner in which cross polarization interference-component is eliminated from one of the received polarized plain waves. In the polarization transmitting system 86 of FIG. 14, the transmitted V-polarized wave and H-polarized wave separately propagate through radio space and separately received in a receiving apparatus 84. Interference is developed in antennas on a transmitting apparatus (not shown) and those on receiving apparatuses 90a, 90b and the radio space, and results in a major cause fault-receiving.

The receiving apparatus 84 of FIG. 14 is composed of a signal demodulating section 91 and an interference eliminating section 92. The V-polarized wave is received in the antenna 90a, down-converted in a mixer 82a, and analog-to-digital converted in an analog-to-digital converter 91b, whereupon the digital signal is inputted to a first demodulator 91c. The demodulated digital signal is equalized in a transversal equalizer 91d, added in an adding section 91f to the demodulated signal of the other polarization, and inputted to an error detecting section 93 to output a detection signal.

On the other hand, the H-polarized wave is received in the antenna 90b, and the analog signal of the H-polarized wave is delayed by a delay element 83 for adjustment to conform the signal time to the V-polarized wave. Then the H-polarized wave is analog-to-digital converted in an analog-to-digital converter 92b and the digital signal is inputted to a second demodulator 92c. The demodulated signal is equalized in a transversal equalizer 92d, and is inputted into the adding section 91f where the resulting signal is added to the demodulated baseband signal to eliminate the interference-component.

The equalizations of the transversal equalizers 91d, 92d are signal processing using delay taps constituting the transversal equalizers 91d, 92d. The transversal equalizers 91d, 92d include a plurality of taps, which are flip-flops connected in series, shifting the bit time of the input signal. Accordingly, the transversal equalizers 91d, 92d equalize and eliminate multipath-components by correlation arithmetic of shifted digital signals on the delay taps, respectively. The amount of interference is extracted in the transversal equalizers 91d, 92d and is input to controllers (CONTROL) 91e, 92e as interference-component signals to ensure an error-free interference eliminating operation. In addition, the amount of interference is utilized to control the operation speed of the analog-to-digital converter 91b, 92b and the delay amount of the delay element 83.

The delay element 83 delays an analog signal by a predetermined time, which is controlled by the controller 92e and is set so that the sampling is carried out at the optimum timing. At the final stage, the error detector 93 outputs a canceling signal. Then the error signal outputted from the error detector 93 is inputted to the transversal equalizer 92d to change the tap coefficients. The oscillator 91n inputs the converting clocks of the analog-to-digital converters 91b, 92b, being controlled by the controller 91e.

However, according to the receiving apparatus 84, unless the receiving wave signal input to the demodulating section 91 and other polarized wave signal input to the interference eliminating section 92 are inputted simultaneously, the interference-component cannot be eliminated sufficiently, and an accurate correlation value cannot be obtained to cancel the amount of interference, resulting in inadequate performance of the polarization interference elimination.

Further, the delay element 83 cannot change the amount of delay without cell breathing; with the setting being fixed, the delay element 83 cannot make a change of the delay amount while the system is working.

Furthermore, the delay element 83, being an analog element, can change the amount of delay due to change of environment, such as temperature, and would be affected by on which signals are transmitted. Therefore, the delay element 83 should be set with taking the foregoing influences into consideration. Setting the amount of delay requires manipulation by an operator watching a monitor on which target values are displayed. Consequently, new technology has been cherished which realizes a polarization interference eliminating apparatus that enables an error-free adjustment, is compact in size, and is stabilized in operation.

SUMMARY OF THE INVENTION

With the foregoing problems in view, it is an object of the present invention to provide apparatus and bit-shift method for eliminating cross polarization interference in which an amount of delay is changed without cell breathing irrespective to an operator and which operates stably without an adjustment and which is constituted to be high-density.

Therefore, according to the first aspect of the present invention, there is a provided the cross polarization interference eliminating apparatus comprising a signal demodulating section for receiving a first signal resulting from one of radio signals, which are transmitted in a modulated and encoded form respectively using two kinds of polarized plane waves intercrossing at right angles in a common frequency band, and for analog-to-digital converting, demodulating and equalizing the received first signal to output a first baseband signal; an interference eliminating section for receiving a second signal resulting from the other radio signal, analog-to-digital converting the received second signal to obtain a digital signal, delaying the obtained digital signal by a predetermined time, and demodulating and equalizing the resulting digital signal to output a second baseband signal; and an adding section for adding the second baseband signal from the interference eliminating section to the first baseband signal from the signal demodulating section to output a composite signal; the interference eliminating section including: an analog-to-digital converter for converting the second signal to output a digital signal; a demodulator, connected to the analog-to-digital converter, for delaying the digital signal from the analog-to-digital converter by the predetermined time; an equalizer, connected to the demodulator, for equalizing the digital signal from the demodulator, the equalizer having a plurality of taps whose coefficients are variable for outputting the second baseband signal; a controller, connected to the equalizer, for reading/writing the coefficients of the taps in the equalizer and outputting a control signal to the outside of the controller, and a timing adjuster, connected to the controller and the demodulator, for setting a delay time in the demodulator in accordance with the control signal from the controller.

The above-mentioned apparatus enables to adjust delay time automatically, sample at the optimum timing and control delay of a digital signal to eliminate interference-component sufficiently. And as another advantage of the present invention, if cross polarization does not interfere, interference is eliminated at the normal timing; otherwise if cross polarization interferes, interference is eliminated by generating a predetermined amount of delay.

According to the second aspect of the present invention, the timing adjuster may include a counter, connected to the controller, for outputting n kinds of binary signals, which are synchronized with a high-speed clock equal to n times a clock speed of the demodulated signal, and a low-speed clock, which is synchronized with the clock speed of the demodulated signal, where n is a natural number, and a decoder, connected to the counter and having n output lines, for inputting to the demodulator binary digits of the n output lines in synchronism with the high-speed clock in such a manner that the binary digit of only one of the n output lines is different from the binary digits of the remaining output lines in correspondence to the n kinds of binary signals from the counter; and wherein if the control signal is an activation command, the binary digits of the n output lines in the decoder are updated, and if the control signal is an inactivation command, the binary digits of the n output lines in the decoder are not updated.

Accordingly, such a timing adjuster enables to occur bit-delay of a predetermined time by controlling pulse of a control signal to delay digital signals.

As a preferable feature of the present invention, the timing adjuster may include an output unit for outputting binary digits of n output lines, which are synchronized with a high-speed clock equal to n times a clock speed of the demodulated signal, in such a manner that the binary digit of only one of the n output lines are different from the binary digits of the remaining output lines, where n is a natural number, and a clock generator for outputting a low-speed clock, which is synchronism with a clock speed of the demodulated signal; and wherein if the control signal is an activation command, the binary digits of the n output lines in the output unit are updated, and if the control signal is an activation command, the binary digits of the n output lines in the output unit are not updated.

According to the timing adjuster, the amount of delay or precede enables to be adjusted based on the amount of delay of digital signals. And the amount of interference in the demodulating section is followed within the real time so that the amount of delay is changed without cell breathing.

As another preferable feature of the present invention, the demodulator may have a first holding sections, connected to the analog-to-digital converter and the timing adjuster, for rewriting holding portions corresponding to the n output lines from the timing adjuster into a value of the demodulated signal to output binary digits of n bits; a second holding section, connected to the first holding section and the counter in the timing adjuster, for storing the binary digits of n bits from the first holding section in synchronism with the low-speed clock from the counter; and a third holding section, connected to the second holding section, for storing the binary digits of n bits, which are stored in the second holding section, at a clock speed synchronized with the clock speed of the demodulated signal to be inputted from the outside of the third holding section.

Accordingly, it is possible to change the operation even while the system is working without operation by an operator, fine adjustments can be realized. Also it is possible to set the amount of delay, regardless of the change of environment, such as temperature.

The controller further may have a timing detector for extracting an amount of interference of cross polarization, based on the coefficients of the taps in the equalizer and outputting a value of the extracted amount as amount-of-delay information; and a control-signal output device for outputting the control signal to activate the demodulator to delay, based on the amount-of-delay information from the timing detector and an interference-component signal from the outside of the control-signal output device.

Therefore, digital signal inputted to the demodulating section and digital signal inputted to the cross polarization interference eliminating section are adjusted to synchronize with each other and to be eliminate interference-component easily.

As still another feature of the present invention, a bit-shift method for eliminating interference of cross polarized plain waves in synchronism with a multiplied clock equal to n times a clock of demodulated baseband signal, where n is a natural number, the method comprising the steps of discriminating, based on an amount of the interference of cross polarized plane waves, whether or not a digital signal should be delayed; if the digital signal should not be delayed in the discriminating step, outputting the n kinds of binary signals, which are synchronized with the multiplied clock, and a low-speed clock, which is synchronized with a clock of the demodulated baseband signal, and if the digital signal should be delayed in the discriminating step, stopping the outputting of the n kinds of binary signals and the low-speed clock; designating a particular holding portion in the first holding portion, which has n holding portions each holding a binary digit; writing a binary digit of 1 bit of the digital signal, which is synchronized with the multiplied clock, in the particular holding portion designated in the designating step; writing binary digits of the individual holding portions, which constitute the first holding section, one into each of n holding portions in a second holding section where each holding portion may hold a binary digit, by the low-speed clock; and writing binary digits of the individual holding portions, which constitute the second holding section, one into each of n holding portions in a third holding section where each holding portion may hold a binary digit, by the baseband signal clock.

According to the above-mentioned method, the sampling timing is adjusted automatically by the timing adjuster to eliminate the other polarized plain wave interference component as much as possible. Since the simple digital apparatus controls amount of delay, it is possible to promote introduction of the present system with advantage of reasonable amount of investment for manufacturing, as well as labor-free adjustments, reduction of apparatus to a compact size and stabilized operation.

BRIEF DESCRIPTION OF THE DRAWINGS

FIGS. 7 through 9 are a timing chart of a timing adjusting section of the present apparatus;

FIGS. 10 through 12 are a timing chart of a timing adjusting section of the present apparatus when bit delay takes place;

DESCRIPTION OF THE PREFFERED EMBODIMENT

A preferred embodiment of the present invention will be described with reference to be accompanying drawings.

Figure 1:
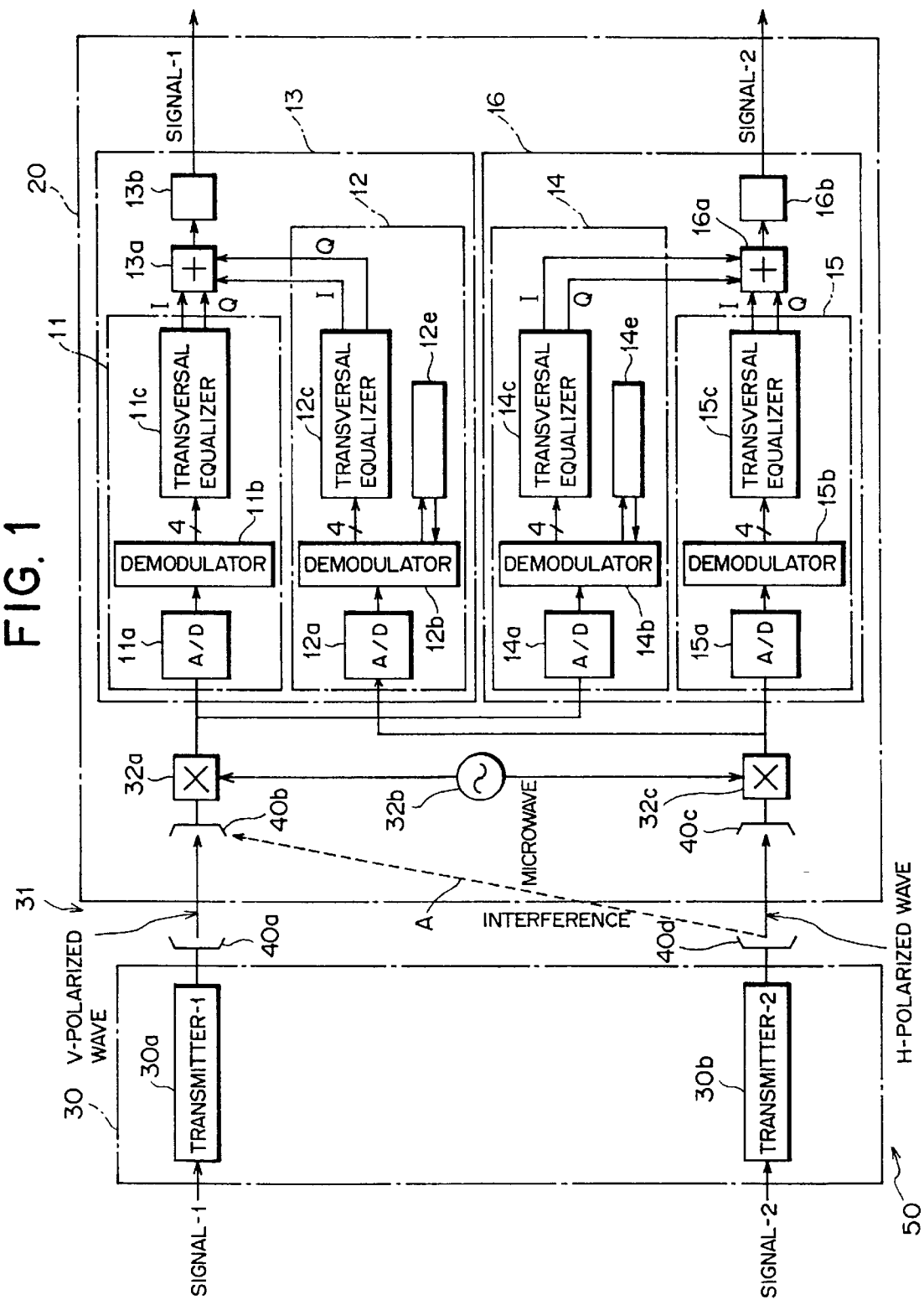
FIG. 1 is a block diagram schematically showing a cross polarization reference eliminating system according to one embodiment of the present invention is applied.

(A) Description of One Embodiment:

FIG. 1 is a diagram schematically showing a cross polarization transmission system to which the present invention is applied. The cross polarization transmitting system 50 of FIG. 1 is a multiplex radio transmitting system, for microwave frequency band which serves as a trunk circuit and is composed of a transmitting apparatus 30 and a receiving apparatus 20 connected to the transmitting apparatus via a radio space 31.

The transmitting apparatus 30 modulates signals to be transmitted (hereinafter called the object signals) and divides the demodulated signals a vertical polarized plane wave (V-polarized wave) and a horizontal polarized plane wave (H-polarized wave) by a necessary process, whereupon the transmitting apparatus 30 transmits the object signals two kinds of polarized plain waves intercrossing at right angles in a common frequency band. Specially, the object signals are separately transmitted in the form of signal-1 on the V-polarized wave and signal-2 on the H-polarized wave. Signal-1 is transmitted using the V-polarized wave and, in the meantime, signal-2 is transmitted using the H-polarized wave in the same frequency band. The transmitting apparatus 30 is composed of a first transmitting section 30a, an antenna 40a, a second transmitting section 30b and an antenna 40d. In FIG. 1, the transmitting sections 30a, 30b are respectively depicted as transmitter-1 and transmitter-2, respectively, for convenience.

The first transmitting section 30a transmits signal-1 from the antenna 40a into the radio space 31 using the V-polarized wave in the common frequency band. Accordingly, the antenna 40a serves as a transmitting antenna. Likewise the second transmitting section 30b transmits signal-2 from the antenna 40d into the radio space 31 using the H-polarized wave in the common frequency band, the antenna 40d serving as another transmitting antenna.

The first and second transmitting sections 30a, 30b modulate signals by QAM (Quadrature Amplitude Modulation) scheme. As is well known in the art, in QAM scheme, the modulating speed can be increased to four times the baseband signal speed, thus simplifying modulating circuit and a demodulating circuit.

At the receiving side, an I channel signal and a Q channel signal are multiplied by a digital cosine signal and a digital sine signal, respectively, whose speed is four times the speed of the respective channels, and as a result, modulated signals are objected as object signals. For example, I channel data having a baseband signal speed is multiplied by a digital sine signal of a speed four times the I channel signal speed to obtain a data sequence: I, 0, −I, 0, I, 0, −I, 0, I, 0, −I, 0, . . . . Likewise Q channel data having a baseband signal speed is multiplied by a digital cosine signal of a speed four times the Q channel signal speed to obtain a data sequence: 0, Q, 0, −Q, 0, Q, 0, −Q, 0, Q, 0, −Q, . . . The resulting object signals to be transmitted include the two data sequences as a composite serial data sequence, which has a time-interval of inverse number of the demodulated speed: I, Q, −I, −Q, I, Q, −I, −Q, I, Q, −I, −Q . . . Subsequently, at the receiving side, the received signals are demodulated, and each component I, Q, −I and −Q are extracted from the serial data sequence of the above-mentioned time-interval.

The radio space 31 is a radio wave propagation path where the V-polarized wave transmitted from the transmitting section 30a is superimposed by an interference-component of the H-polarized wave transmitted from the transmitting section 30b. Interference occurs not only at the transmitting antennas 40a, 40d but also at receiving antennas (later-described antennas 40b, 40c). In the following description, assume that interference occurs at the receiving antennas.

On the other hand, the receiving apparatus 20 receives radio signals transmitted using two kinds of polarization intercrossing at right angles in a common frequency. The receiving apparatus 20 includes a first antenna 40b, a frequency converting section 32a, a cross polarization interference eliminating apparatus 13, a second antenna 40c, another frequency converting section 32c, another cross polarization eliminating apparatus 16, and a local oscillator 32b.

The first antenna 40b receives the V-polarized wave and, in the mean time, the second antenna 40c receives the H-polarized wave. The V-polarized wave received via the first antenna 40b is superimposed by the interference-component of the H-polarized wave transmitted from the transmitting section 30b, as indicated by a dotted line A.

The frequency converting section 32a down-converts a radio signal transmitted using the V-polarized wave into intermediate-frequency signal which is to be inputted to the cross polarization interference eliminating apparatus 13, 16 as a signal originating from the radio signal. The intermediate-frequency signal inputted into the cross polarization interference eliminating apparatus 13 is a signal for demodulating and called a first signal. The intermediate-frequency signal inputted to the cross polarization interference eliminating apparatus 16 is a signal for eliminating cross polarization interference and called a second signal.

In the same manner, the frequency converting section 32c down-converts a radio signal transmitted using the H-polarized wave into an intermediate-frequency signal which is to be inputted into the cross polarization interference eliminating apparatus 13, 16 as a signal originating from the radio signal. The signal inputted to the cross polarization interference eliminating apparatus 13 from the frequency converting section 32c is a second signal for eliminating the cross polarization interference, and the signal inputted to the cross polarization interference eliminating apparatus from the frequency converting section 32c is a first signal for demodulating. The local oscillator outputs carrier waves of the microwave band.

The cross polarization interference eliminating apparatus 13 receives the first signal from the frequency converting section 32a and the second signal from the frequency converting section 32c, demodulates the first signal of the V-polarized wave into signal-1 and eliminates the cross polarization interference using the second signal of the H-polarized wave. Specifically, the cross polarization interference eliminating apparatus 13 makes an optimum adjustment as by shifting a sampling timing of the H-polarized wave, being a different polarized plane wave, and eliminates the interference-component as much as possible to prevent any loss of the received data.

The cross polarization interference eliminating apparatus 13 comprises a signal demodulating section 11, an interference eliminating section 12, an adding section 13a, and an error detecting section 13b. The cross polarization interference eliminating apparatus 13 further comprises a control section 11f, 12d, an oscillator 11e, and a phase processing section 12f, which are not shown in FIG. 1 but in FIG. 2 in connection with which the cross polarization interference eliminating apparatus will be described later.

The cross polarization interference eliminating apparatus 16 receives the first signal from the frequency converting section 32c and the second signal form the frequency converting section 32a, demodulates the first signal of the H-polarized wave into signal-1, and eliminates the cross polarization interference using the second signal of the V-polarized wave. Specifically, the cross polarization interference eliminating apparatus 16 makes an optimum adjustment as by shifting a sampling timing of the V-polarized wave, which is a different polarized plane wave, and eliminates the interference-component as much as possible to prevent any loss of the received data.

The cross polarization interference eliminating apparatus 16 comprises a signal demodulating section 15, an interference eliminating section 14, an adding section 16a, and an error detecting section 16b. Further, the cross polarization interference eliminating apparatus 16 of FIG. 1 is identical in construction with the cross polarization interference eliminating apparatus 13 of FIG. 2, so the correspondence between these two cross polarization interference eliminating apparatuses will be described after describing the cross polarization interference eliminating apparatus 16 using FIG. 2.

Figure 2:
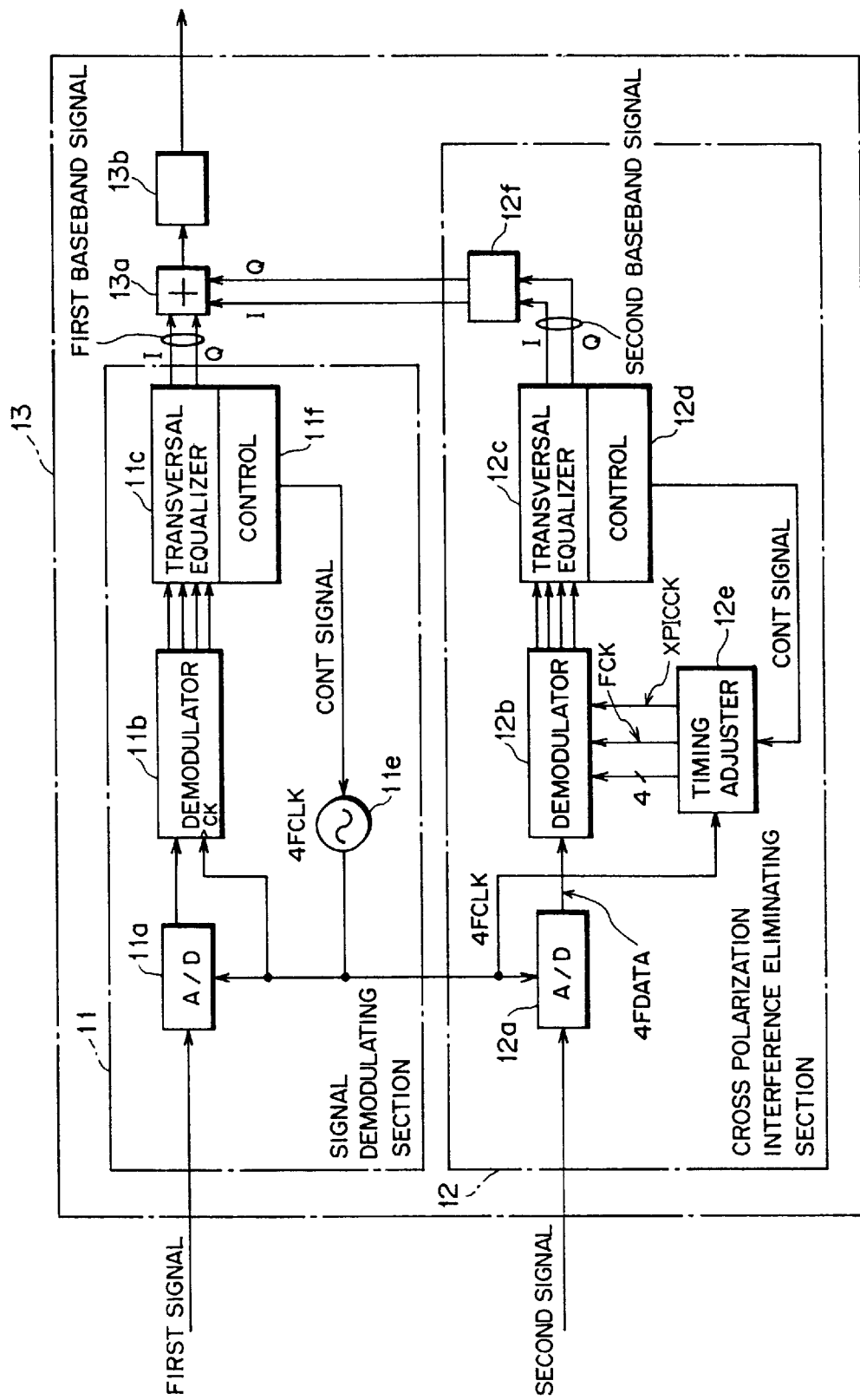
FIG. 2 is a block diagram schematically showing a crossing polarization transmission apparatus to which the present invention is applied.

Then the block configuration of the cross polarization interference eliminating apparatus 13 of FIG. 1 will be described in further detail using FIG. 2. FIG. 2 schematically shows the cross polarization interference eliminating apparatus 13. Repetition of description about the cross polarization interference eliminating apparatus 16, which is identical in construction with the cross polarization interference eliminating apparatus 13 as illustrated in block diagram, will be omitted here.

The cross polarization interference eliminating apparatus 13 comprises of the signal demodulating section 11, the interference eliminating section 12, the adding section 13a, and an error detecting section 13b.

The signal demodulating section 11 receives the first signal resulting from one of radio signals, transmitted respectively using two kinds of polarization intercrossing at right angles in a common frequency band, whereupon it analog-to-digital converts, demodulates and equalizes the received first signal as a first baseband signal to be outputted. The signal demodulating section 11 includes the oscillator 11e, the analog-to-digital converter section (hereinafter also called the analog-to-digital converter) 11a, the demodulating section (hereinafter also called the demodulator) 11b, a transversal equalizer (equalizing section) 11c, and a controller (CONTROL) 11f. In the following description, the term "first baseband signal" means a demodulated signal.

The oscillator 11e outputs a predetermined speed clock (4FCLK) whose speed is four times the baseband signal speed.

The analog-to-digital converter 11a analog-to-digital converts the first signal into a digital signal, operates at a speed four times the baseband signal speed, and inputs 4FCLK of the oscillator 11e shown in FIG. 2. The first signal inputted to the analog-to-digital converter 11a from the left side in FIG. 2 is sampled at a speed four times the baseband signal speed. Namely, the speed of modulating the baseband signal is to set a quarter of the speed of the analog signal so that the analog signal is converted I, Q, −I, −Q, I, Q, −I, −Q, I, Q, −I, −Q, . . . at the modulating speed.

Further, the demodulator 11b, connected to the analog-to-digital converter 11a, for demodulating the digital signal outputted from the analog-to-digital converter 11a. Specifically, the demodulator 11b receives the digital signal output from the analog-to-digital converter 11a and the clock from the oscillator 11e (4FCLK), and outputs 4 kinds of digital signals. The 4FCLK clock is divided into four in the demodulator 11b, being used as a timing clock for the baseband signal.

The transversal equalizer 11c, connected to the demodulator 11b, for equalizing the digital signal output from the demodulator 11b as the first baseband signal to be outputted, having a plurality of taps whose coefficients are variable to output first baseband signal. The transversal equalizer 11c equalizes deteriorations due to the interference, and will be described more in detail later.

The controller 11f, connected to the transversal equalizer 11c, for reading/writing the coefficients of the taps in the transversal equalizer 11c, and outputs a control signal (CONT signal) to the outside of the controller 11f. The CONT signal indicates, for example, an activation command with positive logic (H) and an inactivation command with negative logic (L). The control section 11f shifts the array of bits of the digital signals as described later.

The analog-to-digital converter 11a analog-to-digital converts the fist signal inputted into the signal demodulating section 11. The demodulator 11b demodulates and outputs the demodulated digital signal to the transversal equalizer 11c where the resultant signal is equalized and the first baseband signal, in the form an I channel signal and a Q channel signal, is outputted. The controller 11f reads the coefficients of a plurality of the taps of the transversal equalizer 11c, and outputs the CONT signal to the oscillator 11e to adjust the converting speed of the analog-to-digital converter 11a.

The interference eliminating section 12 of FIG. 2 receives the second signal originating from the other radio signal, of the transmitted radio signals, analog-to-digital converts the second signal, and delays the converted digital signal by a predetermined time, whereupon it demodulates and equalizes the digital signal as a second baseband signal to be outputted. The interference eliminating section 12 includes an analog-to-digital converter 12a, a demodulating section (hereinafter also called the demodulator) 12b, a transversal equalizer (hereinafter also called the equalizing section) 12c, a controller (CONTROL) 12d, a timing adjuster (hereinafter also called the timing adjusting circuit) 12e, and a phase processing section 12f. The term "second baseband signal" means a signal for eliminating cross polarization interference.

The analog-to-digital converter 12a analog-to-digital converts the second signal into a digital signal to be outputted and operates in response to the 4FCLK clock from the oscillator 11e in the signal demodulating section 11 to output 4FDATA, which is a serial array of digital signals.

The demodulator 12b is connected to the analog-to-digital converter 12a, where the inputted analog signal is converted into the digital signal. Then the digital signal from the analog-to-digital converter 12a is delayed by a predetermined time as four kinds of signals. How to control the bit delay time will be described later.

The transversal equalizer 12c is connected to the demodulator 12b for equalizing the digital signal from the demodulator 12b to output the second baseband signal, having a plurality of taps whose coefficients are variable for outputting the second baseband signal. The transversal equalizer 12c equalizes deteriorations due to the interference and outputs both the I channel signal and the Q channel signal.

The controller 12d is connected to the transversal equalizer 12c for reading/writing the coefficients of a plurality of the taps in the transversal equalizer 12c and outputting a control signal (a CONT signal) to the outside of the controller. The CONT signal is similar to the above-described CONT signal, and indicates, for example, an activation command by positive logic and an inactivation command by negative logic. In the specification, same terms are used for similar parts or elements unless otherwise described.

The timing adjuster 12e is connected to the controller 12d and the demodulator 12b for setting the delay time of the demodulator 12b in accordance with the CONT signal from the controller 12d.

The phase processing section 12f inverts the phase of the digital signal output from the transversal equalizer 12c and inputs the resulting digital signal to the adding section 13a.

Subsequently, the adding section 13a of FIG. 2 outputs a composite signal of the first baseband signal from the signal demodulating section 11 and the second baseband signal from the interference eliminating section 12. The error detecting section 13b compares the signal output from the adding section 13a with the correlation values of the transversal equalizers 11c, 12c to detect an error of the output signal in terms of a bit lost on the correlation arithmetic of the transversal equalizers 11c, 12c.

The analog-to-digital converter 12a analog-to-digital converts the second signal inputted to the interference eliminating section 12 and the demodulator 12b demodulates the digital signal, whereupon the demodulator 12b delays the resulting digital signal by the predetermined time to output the delayed digital signal to the transversal equalizer 12c where the signal output from the demodulator 12b and the second baseband signal in the form of the I channel signal and the Q channel signal. The phase processing section 12f inverts the signals respectively, and the adding section 13a cancels the interference-components. Further, the error detecting section 13b detects an error of the resulting signal to output demodulated signal-1.

The controller 12d reads coefficients of a plurality of taps of the transversal equalizer 12c and output the CONT signal to the timing adjuster 12e, based on the coefficients, to control a bit delay time of the demodulator 12b. As described above, the signal demodulating section 11 and the interference eliminating section 12 cooperate with each other to cancel the interference-components.

An interference eliminating section 14 of the cross polarization interference eliminating apparatus 16 of FIG. 1 includes an oscillator 14e, an analog-to-digital converter 14a, a demodulator 14b, and a transversal equalizer 14c which are identical in construction with the oscillator 12e, the analog-to-digital converter 12a, the demodulator 12b and the transversal equalizer 12c, respectively, which are the elements of the interference eliminating section 12 of the cross polarization interference eliminating apparatus 13. The interference eliminating section 14 further includes a controller, a timing adjuster and a phase processing section, though they are not illustrated in the drawings, are identical in construction with the controller 12d, the timing adjuster 12e, and the phase processing section 12f respectively, of the interference eliminating section of FIG. 2. Therefore, the repetition of description about similar elements is omitted.

Likewise a signal demodulating section 15 of the cross polarization interference eliminating apparatus 16 of FIG. 1 includes an analog-to-digital converter 15a, a demodulator 15b, and a transversal equalizer 15c, which are identical in construction with the analog-to-digital converter 11a, the demodulator 11b and the transversal equalizer 11c, respectively, which are the elements of the interference eliminating section 11 on the cross polarization interference eliminating apparatus 13. The demodulating section 15 further includes a controller (not shown), identical in construction with the controller 11f of the demodulating section 11. Therefore, repetition of description about similar elements is omitted.

The adding section 16a and the error detecting section 16b of the cross polarization interference eliminating apparatus 16 are identical in construction with the adding section 13a and the error detecting section 13b, so repetition of description about similar elements is omitted.

A signal in the cross polarization interference eliminating apparatus 16 flows in following manner: (1) a signal inputted to the interference eliminating section 14 is analog-to-digital converted in the analog-to-digital converter 14a, and the converted digital signal is demodulated and then the demodulated digital signal is delayed by a predetermined time in the demodulator 14b for outputting to the transversal equalizer 14c where the resulting signal is equalized for outputting the second baseband signal in the form of the I channel signal and the Q channel signal; (2) phases of the signals are respectively inverted to cancel the interference-components in the adding section 16a; and (3) regarding the canceling signal, error of the object signal to be outputted is detected in the error detecting section 16b, whereupon a modulated signal 2 is outputted. A non-illustrated controller of the interference eliminating section 14 reads one of coefficients of a plurality of taps of the transversal equalizer 14c and output a CONT signal to a timing adjuster 14e, based on the coefficient, to control a bit delay time of the demodulator 14b.

In the cross polarization transmitting system 50, signal-1, signal-2 are separately inputted to the transmitting apparatus 30 and are transmitted using a V-polarized wave and an H-polarized wave through the radio space, during which the V-polarized wave is interfered in the second antenna 40b by the H-polarized wave, as indicated by a dotted line A in FIG. 1 and the interfered V-polarized wave and the H-polarized wave are received on the second antennas 40b, 40c, respectively, of the receiving apparatus 20.

The V-polarized wave is down-converted in the frequency converting section 32a into the first signal to be outputted to the signal demodulating section 11 of the cross polarization eliminating apparatus 13 and into the second signal to be outputted to the interference eliminating section 14 of the cross polarization eliminating apparatus 16. In the meantime, the H-polarized wave is down-converted in the frequency converting section 32c into the second signal to be outputted to the signal demodulating section 12 of the cross polarization eliminating apparatus 13 and into the first signal to be outputted to the interference eliminating section 15 of the cross polarization eliminating apparatus 16.

The signal demodulating section 11 of the cross polarization eliminating apparatus 13 demodulates the first signal, and the transversal equalizer 11c equalizes deteriorations caused by the interference to obtain a desired first baseband signal. The received signal of the other polarization (the H-polarized wave) is inputted to the interference eliminating section 12 in the cross polarization eliminating apparatus 13, and is delayed by a predetermined time, whereupon the resulting signal is demodulated in the same manner as in the demodulating section 11 of the interference eliminating section 13. The transversal equalizer 12c extracts an amount of interference to output the second baseband signal, with its phase is inverted, to the adding section 13a to cancel the interference-components. And the transmitted signal-1 is regenerated.

In the same manner, the signal demodulating section 15 of the cross polarization eliminating apparatus 16 demodulates the first signal, and the transversal equalizer 15c equalizes deteriorations caused by the interference to obtain a desired first baseband signal. The received signal of the other polarization (the V-polarized wave) is inputted to the interference eliminating section 14 in the cross polarization eliminating apparatus 16, and is delayed by a predetermined time, whereupon the resulting signal is demodulated in the same manner as in the demodulating section 15 of the interference eliminating section 16.

The transversal equalizer 14c extracts an amount of interference to output the second baseband signal, with its baseband signal is inverted, to the adding section 16a to cancel the interference-components. And the transmitted signal-2 is regenerated.

A bit delay of the interference eliminating section 12, 14 will be explained using FIG. 3, which schematically shows the timing adjuster 12e and the demodulator 12b according to the embodiment of the present invention. As described above in connection with FIG. 1, the timing adjuster 14e is identical in construction with the timing adjuster 12e; and each of the demodulators 11b, 14b, 15b is identical in construction with the demodulator 12b.

Figure 3:
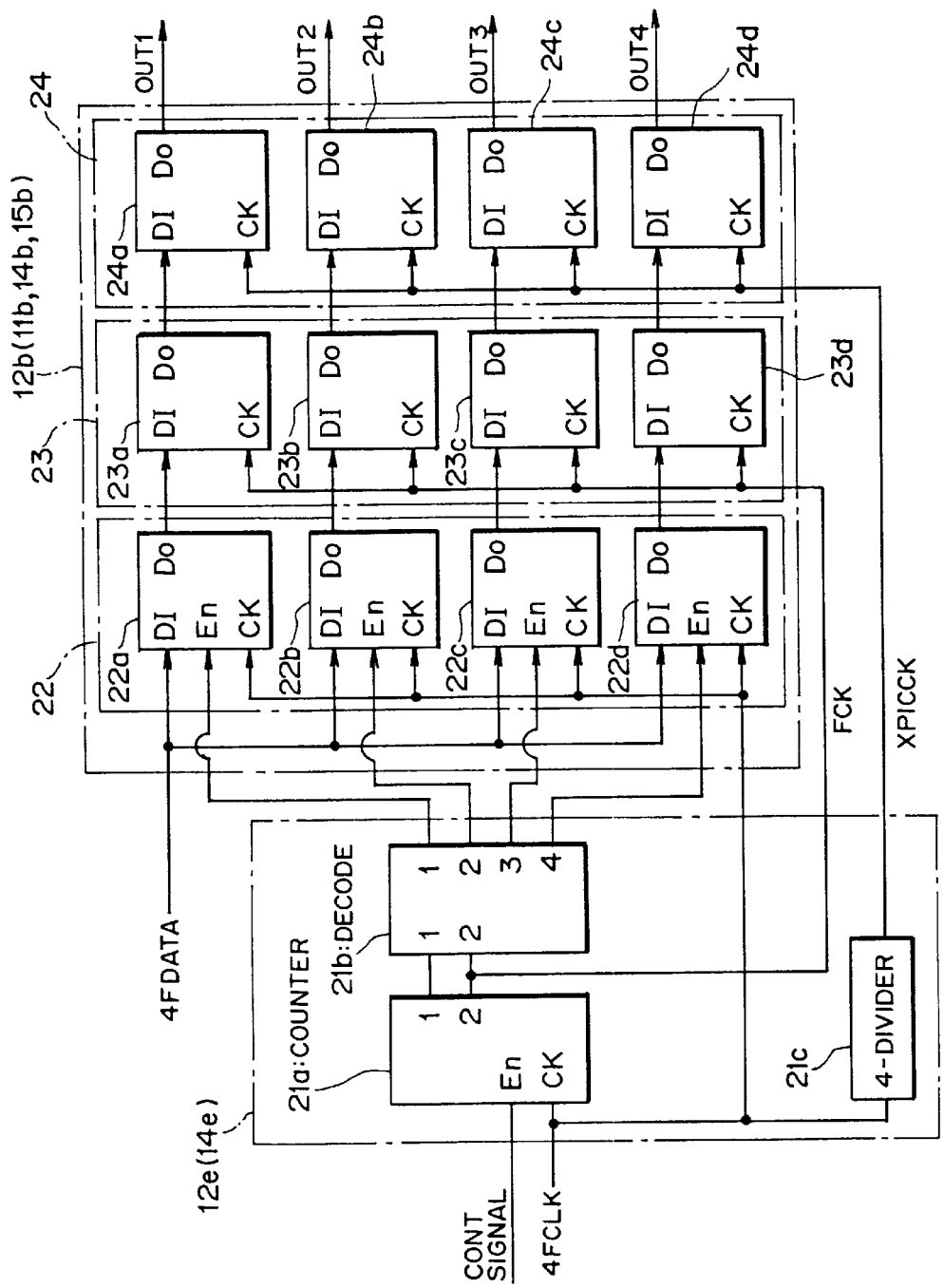
FIG. 3 is a block diagram schematically showing a timing adjuster and a demodulator of the apparatus of the embodiment (hereinafter also called the present apparatus)

The timing adjuster includes, as shown in FIG. 3, a counter (COUNTER) 21a, a decoder (DECODE) 21b and a 4-divider 21c. The counter 21a is connected to the controller 12d for outputting four kind of binary signals, which are synchronized with a high-speed clock equal to four times a clock speed of the demodulated signal, and a low-speed clock, which is synchronized with the clock speed of the demodulated signal, including an input port En, a clock port CK, and output ports 1, 2.

A CONT signal from the enable signal from the controller 12d is inputted to the input port En, and a high-speed clock (4FCLK) is inputted to the clock port CK. If the CONT signal is the positive logic, four kinds of binary signals synchronized with the 4FCLK clock, "00", "01", "10", "11" are outputted from the output ports 1, 2.

The low-speed clock (FCK) synchronized with the clock speed of the demodulated signal, is generated by a signal output from the output port 2. The FCK clock is inputted to the demodulator 12b and is obtained by dividing a high-speed clock. The rising of FCK and 4FCK clocks are coincident. The dividing circuit is omitted in FIG. 3.

The decoder 21b composed of four output lines is connected to the counter 21a for inputting binary digits synchronized with the 4FCLK so that only the binary digit of one of four output lines is different from the binary digits of the other output lines in accordance with the four signals of binary digits from the counter 21a. The decoder 21b includes the input ports 1,2 and the output ports 1, 2, 3, 4, which are called DECODE OUT1, DECODE OUT2, DECODE OUT3, DECODE OUT4 in the following description.

The four kinds of binary digit signals output from the counter 21a ("00", "01", "10", "11") are inputted to the input ports 1, 2. Converting only one binary digit among the four output lines of the output lines 1, 2, 3, 4 to be different from the others means: (1) if the counter 21a outputs "00", the output port 1 is positive logic and the other output ports 2, 3, 4 are negative logic; (2) if the counter 21a outputs "01", the output port 2 is positive logic and the other output ports 1, 3, 4 are negative logic; (3) if the counter 21a outputs "10", the output port 3 is positive logic and the other output ports 1, 2, 4 are negative logic; and (4) if the counter 21a outputs "11", the output port 4 is positive logic and the other output ports 1, 2, 3 are negative logic.

Regarding the counter 21a, if the CONT signal is an activation command, the four binary digits of the decoder 21b are updated, and if the CONT signal is an inactivation command, the four binary digits of the decoder 21b are not updated. Namely, in one signal clock period of the high-speed clock, one of the four signals is designated.

The 4-divider 21c divides a high-speed clock into quarter frequency to output the low-speed clock (XPICCK), always keeps outputting the XPICCK clock and is not activation-controlled in a way that the counter 21a is controlled by the CONT signal.

The demodulator 12b of FIG. 3 includes a first holding section 22, a second holding section 23 and a third holding section 24.

The first holding section 22 is connected to the analog-to-digital converter 12a and the timing adjuster 12e and includes holding portions 22a, 22b, 22c, 22d for rewriting demodulated signals into the holding portions 22a, 22b, 22c, 22d corresponding to the four output lines from the timing adjuster 12e, to output binary digits of four bits. The holding portions 22a, 22b, 22c, 22d are, for example, flip-flops that enables one to maintain a binary digit of each one bit. Each of the holding portions 22a, 22b, 22c, 22d has a data input port DI, an enable signal port En, a clock port CK and a data output port Do.

If the 4FDATA signal is demodulated into "FF (HEX)", one of the holding portions 22a, 22b, 22c, 22d is updated into a value of the modulated signal. The HEX is a value of the hexadecimal scale, so a value sampled from four times the demodulated signal is "FF(HEX)". The outputs of holding portions 22a, 22b, 22c, 22d are also called FF1 OUT1, FF1 OUT2, FF1 OUT3, FF1 OUT4, respectively, in the following description.

The second holding section 23 is connected to the first holding section 22 and the counter 21a in the timing adjuster 12e for showing binary digits from the first holding section 22, in synchronism with a low-speed clock from the counter 21a including holding portions 23a, 23b, 23c, 23d. Each of the holding portions 23a, 23b, 23c, 23d is, for example, a flip-flop enabling to maintain the binary digits of one bit, including a data input port DI, a clock port CK, a data output port Do, to which contents of the output ports of the holding portions 22a, 22b, 22c, 22d are written. The outputs of holding portions 23a, 23b, 23c, 23d are also called FF2 OUT1, FF2 OUT2, FF2 OUT3, FF2 OUT4, respectively, in the following description. The third holding section 24 is connected to the second holding section 23 for showing binary digits of the four bits by the clock signal in synchronism with the clock speed of the demodulated signal, including holding portions 24a, 24b, 24c, 24d. Each of the holding portions 24a, 24b, 24c, 24d is, for example, a flip-flop enabling to maintain the binary digits of one bit including a data input port DI, a clock port CK and a data output port Do, to which contents of the output ports of the holding portions 23a, 23b, 23c, 23d are written. The outputs of holding portions 24a, 24b, 24c, 24d are also called FF3 OUT1, FF3 OUT2, FF3 OUT3, FF3 OUT4, respectively, in the following description.

The 4FDATA output from the analog-to-digital converter 12a is written into, among the holding portions 22a, 22b, 22c, 22d, one whose enable signal is positive logic so resulting in a one-to-four serial-to-parallel conversion. One output, among the holding portions 22a, 22b, 22c, 22d, is updated by the 4FCLK therein and all outputs of the holding portions 22a, 22b, 22c, 22d are updated by the FCK in the holding portions 23a, 23b, 23c, 23d of the second holding section 23. Namely, the output data of the holding portions 22a, 22b, 22c, 22d moves as if the output data is shifted into the holding portions 23a, 23b, 23c, 23d, whose clocks are different from the clock of the holding portions 22a, 22b, 22c, 22d.

All outputs of the holding portions 23a, 23b, 23c, 23d are updated by the XPICCK clock in the holding portions 24a, 24b, 24c, 24d and the output data of the holding portions 23a, 23b, 23c, 23d are retimed to output as Out1, Out2, Out3, Out4. The Out1, Out2, Out3, Out4 correspond to I, Q, −I, −Q respectively, because the third holding section 24 operates with the speed clock equal to four times a clock speed of the demodulated signal as mentioned above. As the result, four kinds of signals for demodulating are obtained.

The timing adjuster 12e of FIG. 3 may be in unitary form combined with the counter 21a and the decoder 21b. In the unitary form, the timing adjuster 12e functions as a combination of the counter 21a and the decoder 21b, using an output unit having four output lines and FCK clock generator.

Namely, the output unit, serving as a combination of the counter 21a and the decoder 21b, outputs the binary signals of the four output lines, which are synchronized with a high-speed clock equal to four times a clock signal speed of the demodulated signal in such a manner that the binary digit of only one of the four output lines is different from the binary digits of the remaining output lines. And the clock generator outputs a low-speed clock, which is synchronism with a clock speed of the demodulated signal. If the CONT signal is an activation command, the binary digits of the four output lines of the output unit are updated, and if the CONT signal is an inactivation command, the binary digits of the four output lines of the output unit are not updated.

The operation of the timing adjuster 12e, when the CONT signal is always the positive logic (H-fixed), will now be described using FIGS. 7 through 9.

Figure 8:
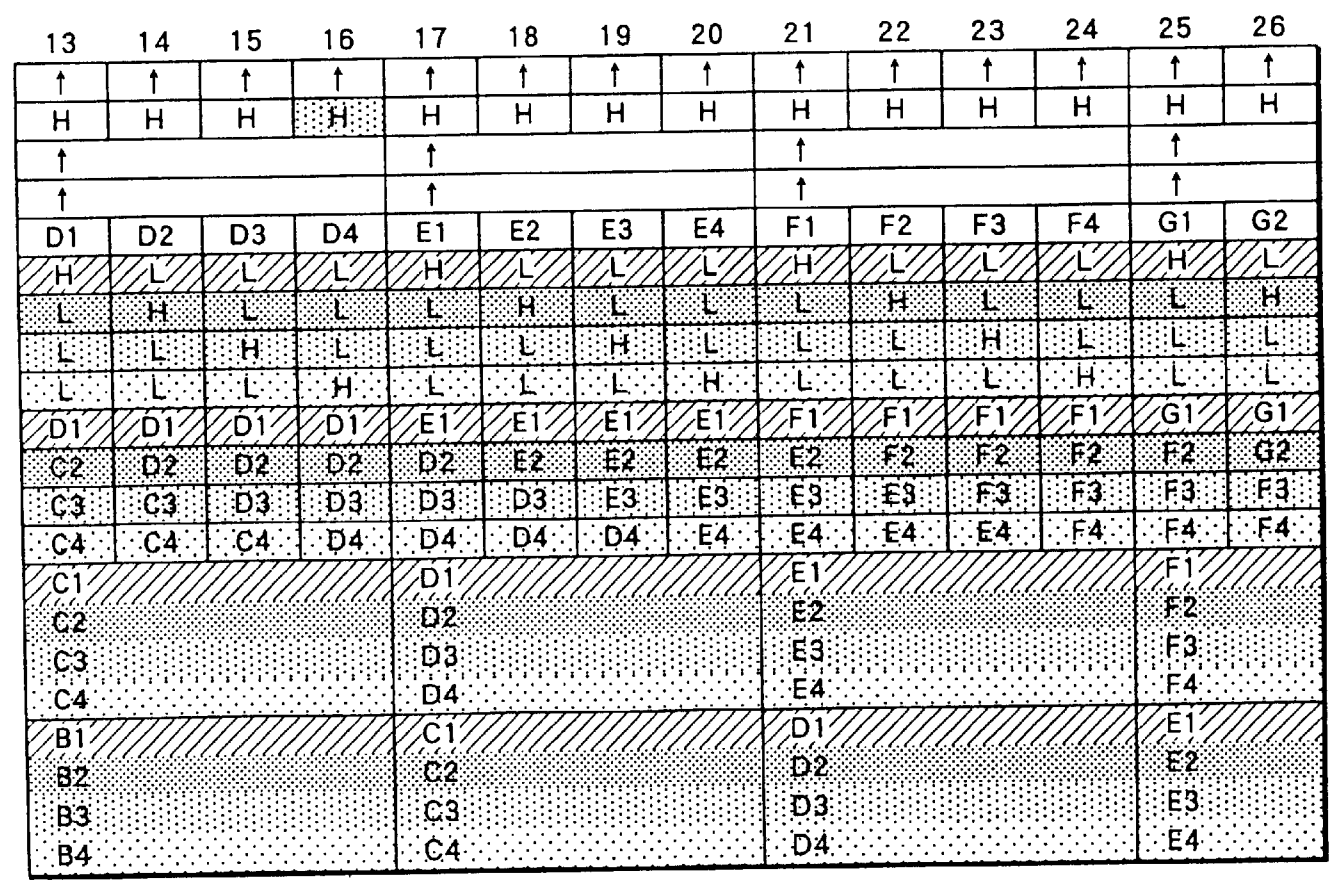

FIGS. 7 through 9 show a timing chart of the timing adjuster 12e according to the present embodiment. The timing adjuster 14e operates as indicated by the timing chart. The timing chart of FIG. 7, in which the starting time point is on the left side, indicates bit values of every 4FCLK. Five fields are set in the left most column of FIG. 7, which are "clock and input signal", "DECODE operation", "4FCLK operation", "FCK operation", and "XPICCK operation".

A value or logic of each of 4FCLK, CONT signal, FCK, XPICCK and 4FDATA is written in the field of the clock and the input signal: the 4FCLK clock is a clock equal to four times a clock speed of clock of the signal; the CONT signal is usually positive logic; the FCK clock is a clock equal to the clock speed of the signal; the XPICCK clock is a clock equal to the clock speed of the signal; and 4FDATA signal is a value sampled from the inputted signal by four times a clock speed, being respected by "A1", "A2", "A3", "A4", "B1", "B2", . . . , which are symbols each identifying individual data values.

The DECODE operation field indicates the outputs of the decoder 21b being composed of subfields of DECODE OUT1, DECODE OUT2, DECODE OUT3, DECODE OUT4. The 4FCLK operation field indicates the outputs of the holding portions 22a, 22b, 22c, 22d, respectively, being composed of subfields of FF1 OUT1, FF1 OUT2, FF1 OUT3, FF1 OUT4. The FCK operation field indicates the outputs of the holding portions 23a, 23b, 23c, 23d, being composed of subfields of FF2 OUT1, FF2 OUT2, FF2 OUT3, FF2 OUT4. The XPICCK operation field indicates the outputs of the holding portions 24a, 24b, 24c, 24d, being composed of FF3 OUT1, FF3 OUT2, FF3 OUT3, FF3 OUT4.

In the following description, the 4FCLK clock is regarded as a sample point of time and is called a clock 20, for example. The initial value of each holding portion is zero.

At the first clock 1, the value of 4FDATA is "A1", and the outputs of the decoder 21b are H, L, L, L. The DECODE OUT1 for the holding portion 22a is positive logic to be selected, and the holding portion 22a stores and indicates "A1". Here H stands for positive logic and L, the negative logic.

At the clock 2, the value of 4FDATA is "A2", and the outputs of the decoder 21b are L, H, L, L. DECODE OUT2 for the holding portion 22b is positive logic to be selected, and the holding portion 22b stores and indicates "A2". The holding portion 22a is neither selected nor updated, keeping indication of "A1". Subsequently, at the clock 3, the value of 4FDATA is "A3", and the outputs of the decoder 21b are L, L, H, L. DECODE OUT3 for the holding portion 22c is positive logic to be selected and the holding portion 22c stores and indicates "A3". The holding portions 22a, 22b are neither selected nor updated, keeping indication of "A1" and "A2", respectively.

At the clock 4, the value of 4FDATA is "A4" and the outputs of the decoder 21b are L, L, L, H. DECODE OUT4 for the holding portion 22d is positive logic to be selected, and the holding portion 22d stores and indicates "A4". The holding portions 22a, 22b, 22c are neither selected nor updated, keeping indication of "A1", "A2", "A3", respectively.

At the clock 5, the decoder 21b and the holding portions 22a, 22b, 22c, 22d operate in the same manner as described above, provided that FCK and the XPICCK clocks are inputted. Namely, by FCK, the values of the holding portions 22a, 22b, 22c, 22d are written into the holding portions 23a, 23b, 23c, 23d, respectively, to be indicated as "A1", "A2", "A3", "A4". At that time the clock of the data is changed to a different clock speed.

At the clock 9, subsequently to the operation at the successive clocks 6 through 8, by FCK, the values of the holding portions 22a, 22b, 22c, 22d are written into the holding portions 23a, 23b, 23c, 23d, respectively, to be indicated "B1", "B2", "B3", "B4". In addition, by the XPICCK, the values of the holding portions 23a, 23b, 23c, 23d are written into the holding portions 24a, 24b, 24c, 24d, respectively, to be indicated as "A1", "A2", "A3", "A4".

During the successive clocks 13 through 26 of FIG. 8 and the successive clocks 27 through 40 of FIG. 9, the data is updated in the same manner as described above.

If the CONT signal is always positive logic (fixed at H), signals are propagates regularly; 4FDATA signal is thereby propagated by the 4FCLK clock, the CONT signal, the FCK clock and the XPICCK clock and, as the result, the operation of the decoder 21b updates the signals regularly.

On the contrary, the manner in which the signal propagation delays with the CONT signal being negative logic will now be described using FIGS. 10 through 12.

Figure 11:
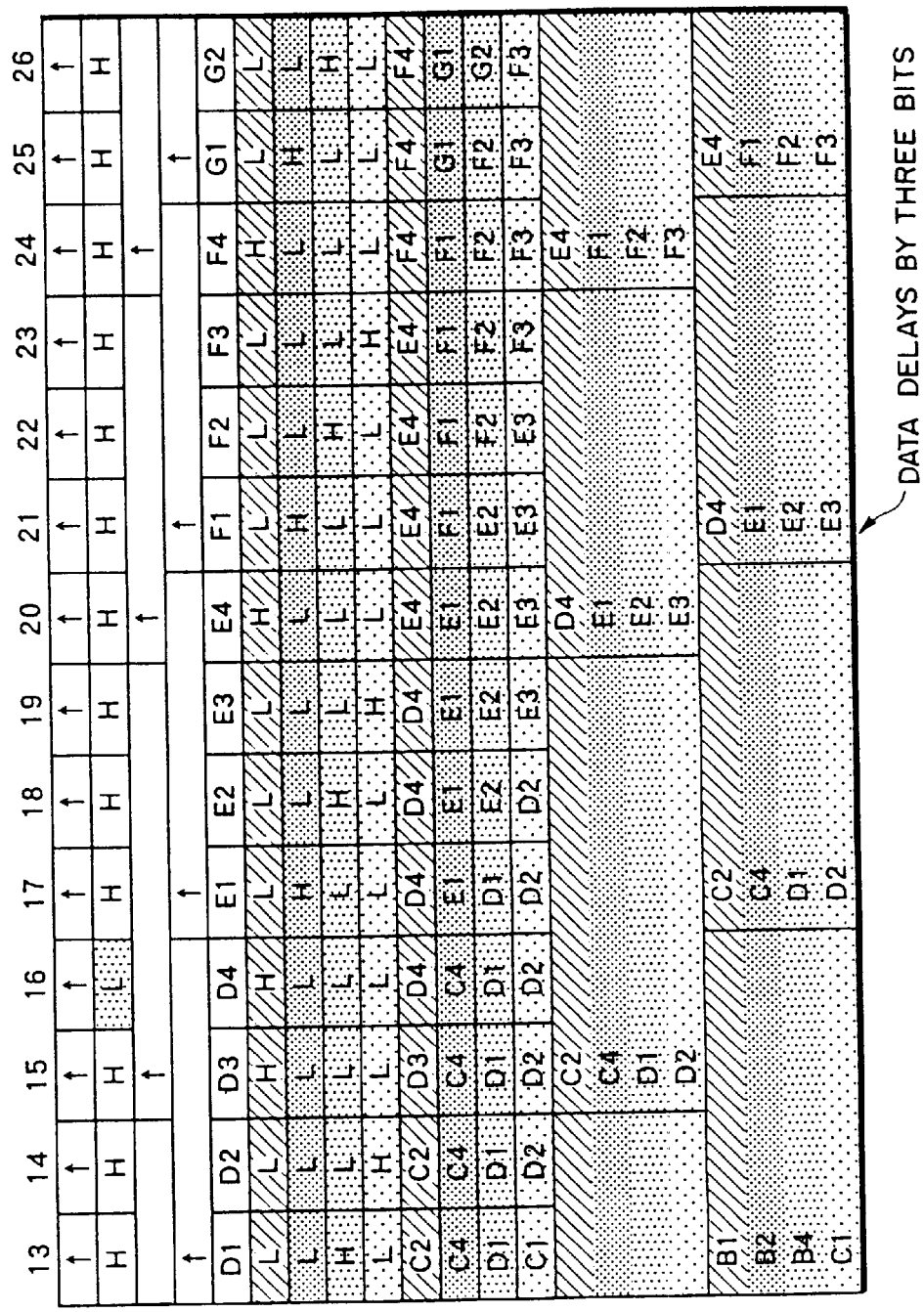

FIGS. 10 through 12 show a timing chart of the timing adjuster 12e according to the present embodiment of the present invention, when the bit delay occurred. The time adjuster 14e operates in the same manner as descibed above.

The contents of each field of FIGS. 10 through 12 is identical with the contents of the timing chart described above using FIGS. 7 through 9, so repetition of description of the identical signals is omitted here. In FIG. 10, negative logic of the CONT signal influences on the individual fields of the DECODE operation, 4FCLK operation and the FCK operation; otherwise, the field of the XPICCK operation, the lowest field, is not influenced by the CONT signal, and it operates in the manner same as described above in connection with in FIGS. 7 through 9.

The operation between the clocks 1 through 7, as shown in FIG. 10 is similar to that described using FIGS. 7 through 9, and the values of the 4FDATA signal is updated from "A1" to "B3".

When the 4FDATA signal becomes "B4" at the clock 8, the CONT signal becomes negative logic. Negative logic of the CONT signal causes the counter 21a to stop operating; so the outputs of the decoder 21b is identical with those of the clock 7, L, L, H, L. Further, DECODE OUT3 for the holding portion 22c keeps as selected and the holding portion 22c is updated one more time to store and indicate "B4". At this time, the holding portions 22a, 22b, 22c, 22d are not selected to be updated and therefore keep indicating "B1", "B2", "A4", respectively. And the values of the holding portions 23a, 23b, 23c, 23d are not updated and keep indicated "A1", "A2", "A3", "A4", respectively, which are identical with the values at the clock 7, because the FCK clock is not inputted.

As the CONT signal returns to positive logic at the clock 9, the outputs of the decoder 21b becomes L, L, L, H, and the outputs of the individual holding portions 21a, 21b, 21c, 21d are changed into "B1", "B2", "B4", "C1". Therefore the holding portion 21b is updated. By XPICCK, the values of the holding portions 23a, 23b, 23c, 23d are written into the holding portions 24a, 24b, 24c, 24d to be indicated as "A1", "A2", "A3", "A4". The clock of the data is changed into a different clock speed. Thus, only the contents of the decoder 21b at a particular position can be converted.

At the clock 10, the contents of the holding portions 21a, 21b, 21c, 21d are updated, and by XPICCK, the values of the holding portions 22a, 22b, 22c, 22d are written into the holding portions 23a, 23b, 23c, 23d to be indicated "B1", "B2", "B4", "C1".

At the clock 12, the CONT signal becomes negative logic for the second time as shown in FIG. 10, and the output of the decoder 21b keeps indicating L, H, L, L. Therefore the values of the individual holding portions 21a, 21b, 21c, 21d becomes "C2", "C4", "B4", "C1" and only the holding portion 21b is updated.

Subsequently, the CONT signal returns to positive logic again at the clock 13 as shown in FIG. 11. By XPICCK, which is a clock inputted regularly, the values of the holding portions 23a, 23b, 23c, 23d are written into the holding portions 24a, 24b, 24c, 24d, respectively, to be indicated "B1", "B2", "B4", "C1". At the clocks 14, 15, the data is written in the routine manner, and more specifically, at the clock 15, the values of the holding portions 22a, 22b, 22c, 22d are written into the holding portions 23a, 23b, 23d, 23d, which delay updating, to be indicated as "C2", "C4", "D1", "D2".

At the clock 16, when the CONT signal becomes negative logic for the third time, only the holding portion 21a is updated, and the outputs of the holding portions 21a, 21b, 21c, 21d becomes "D4", "C4", "D1", At the succeeding clock 17, the CONT signal returns to positive logic, and the outputs of the holding portions 21a, 21b, 21c, 21d become "D4", "E1", "D1", "D2". Meanwhile, by XPICCK, which is inputted regularly, the values of holding portions 23a, 23b, 23c, 23d are written into the holding portions 24a, 24b, 24c, 24d, respectively, to be indicated as "C2", "C4", "D1", "D2".

At the clock 19 succeeding the clock 18, the outputs of the holding portions 22a, 22b, 22c, 22d become "D4", "E1", "E2", "E3", and are written into the holding portions 23a, 23b, 23c, 23d to be indicated as "D4", "E1", "E2", "E3", at the next clock 20.

At the clock 21, by XPICCK, the outputs of holding portions 23a, 23b, 23d, 23d are written into the holding portions 24a, 24b, 24c, 24d, respectively. Comparing the operation at the clock 21 in FIG. 8 with that in FIG. 11, the outputs "D1", "D2", "D3", which should have been outputted in FIG. 8, are not output; this is, three bits of "D1", "D2", "D3" are delayed, and "D4", "E1", "E2" are outputted in FIG. 11.

Thus, returning the CONT signal to negative logic three times results in a three-bit delay. Returning the CONT signal to negative logic a plurality of times results in a same-number-bit delay.

During the successive clocks 22 of FIGS. 11 to 27 of FIG. 12, the routine operation takes place. At the clock 28 of FIG. 12, the CONT signal becomes negative clock for the fourth time, and the sum of amounts of delay becomes four bits. At the clock 29, by XPICCK, the outputs of the holding portions 23a, 23b, 23c, 23d are written into the holding portions 24a, 24b, 24c, 24d, respectively, and by FCK, the outputs of the holding portions 22a, 22b, 22c, 22d are written into the holding portions 23a, 23b, 23c, 23d.

At the clock 37, by XPICCK, the output of the individual holding portions 23a, 23b, 23c, 23d are written into the holding portions 24a, 24b, 24c, 24d to be indicate as "H1", "H2", "H3", "H4", and the four-bit-delay results in a ravel of delay. Namely, comparing the operations at the clock 37 in FIG. 9 with that in FIG. 12, the identical outputs "H1", "H2", "H3", "H4" are stored in either of the two XPPICK fields.

Returning the CONT signal to negative logic four times result in a four-bit delay, to assume the original bit-array, enabling adjustment of bit-shift amount. And the timing adjuster 12e adjusts the delay time automatically so that samplings can be carried out at an optimum timing. Since a different polarized signal inputted to the demodulating section 11 is also inputted to the interference eliminating section 12 at the same time point, interference-components can be eliminated sufficiently.

Because the delay circuit is constituted without an analog element, such as a delay element, the delay amount is concerted automatically without a cell breathing while the system is working.

Figure 4:
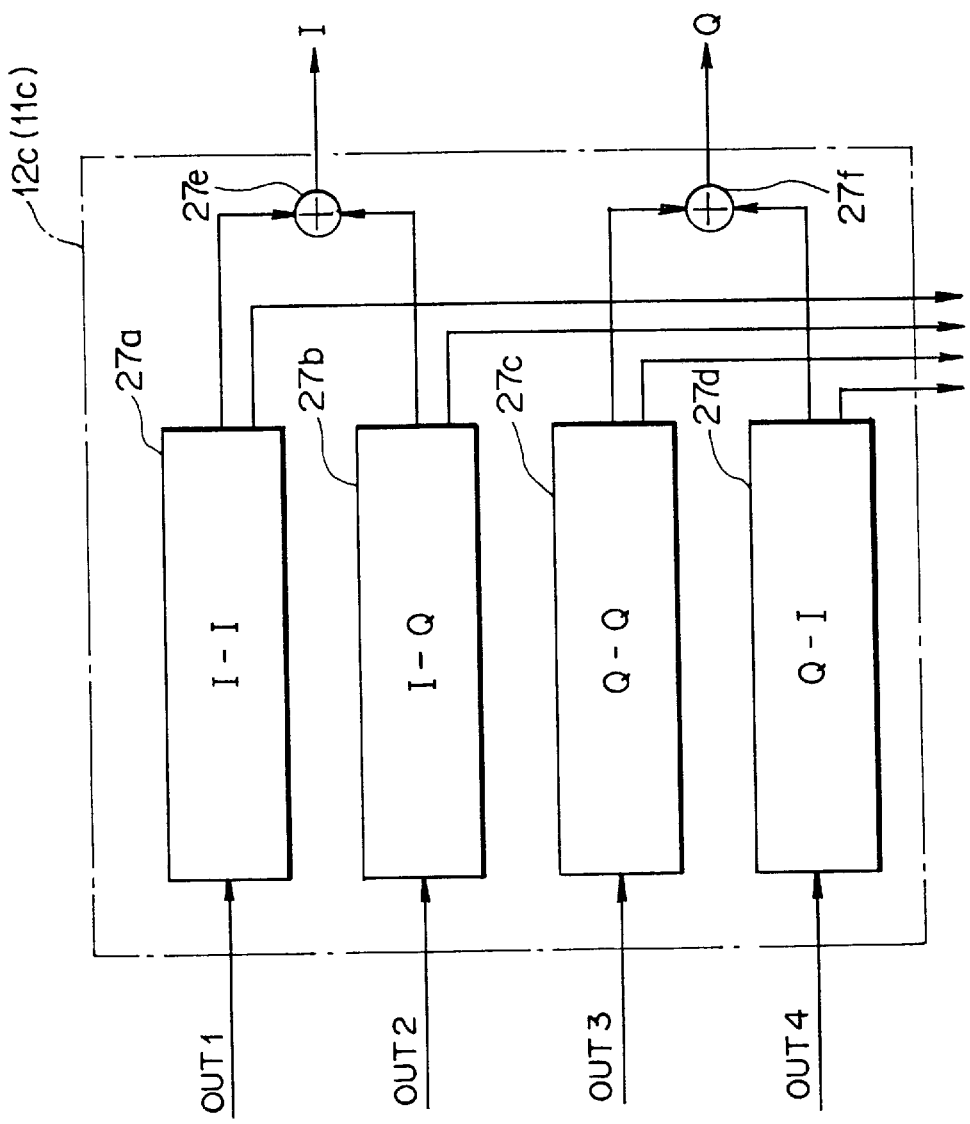
FIG. 4 is a diagram schematically showing a transversal equalizer of the present apparatus.

The transversal equalizer 12c and the controller 12d will be now described in detail. FIG. 4 schematically shows a transversal equalizer 12c according to the present embodiment. The transversal equalizer 12c of FIG. 4 is composed of correlation value calculating sections 27a, 27b, 27c, 27d, and adding sections 27e, 27f. The transversal equalizers 11c, 14c, 15c have the same elements as those of the transversal equalizer 12c of FIG. 4.

The correlation value calculating sections 27a calculates a correlation value between the two I channel signals, and functions with, for example, a plurality of taps connected in column (not shown), whose tap coefficients changeable from outside the apparatus. The correlation value calculating section 27a has a center tap located at the center of the plural taps, and a plurailty of echo taps located at opposite sides of the center tap. The coefficients of the center tap and the echo taps are used in calculating the delay amount as described below.

The correlation value calculating sections 27b, 27c, 27d, calculates a correlation value between the I channel signal and the Q channel signal, between the two Q channel signals, and between the Q channel signal and the I channel signal, respectively, and function with a plurality of taps connected in column (not shown) in the same way as the correlation value calculating section 27a. The coefficients of the center tap and the echo taps are used in calculating of the delay amount as described below.

Namely, the center tap of the tap group indicates the main signal, and the taps other than the center tap represent multipath signals which delay or precede with respect to the main signals. Weights of taps indicating multipath signals other than the main signals are changed to eliminate noise from the multipath signals. The term "weights" means the converting coefficients of individual taps, which are variable for being set to optimum values.

The adding section 27e adds the outputs of the correlation value calculating sections 27a, 27b. Specifically, the adding section 27e equalizes the outputs of the correlation value calculating sections 27a, 27b by eliminating noise from the multipath signals and outputs the I channel signal. The adding sections 27e, like the adding section 27e, adds the outputs of the correlation value calculating sections 27c, 27d. Specifically, the adding section 27f equalizes outputs of the correlation value calculating sections 27c, 27d by eliminating noise from the multipath signals and outputs the Q channel signal.

The four demodulated signals Out1, Out2, Out 3, Out4 are inputted to the correlation value calculating sections 27a, 27b, 27c, 27d, respectively, where the coefficients of taps are converted into optimum values in accordance with receiving status. The outputs of the correlation value calculating sections 27a, 27b are added to output the equalized I channel signal in the adding section 27e. And the outputs of the correlation value calculating sections 27c, 27d are added to output the equalized Q channel signal in the adding section 27e.

Figure 5:
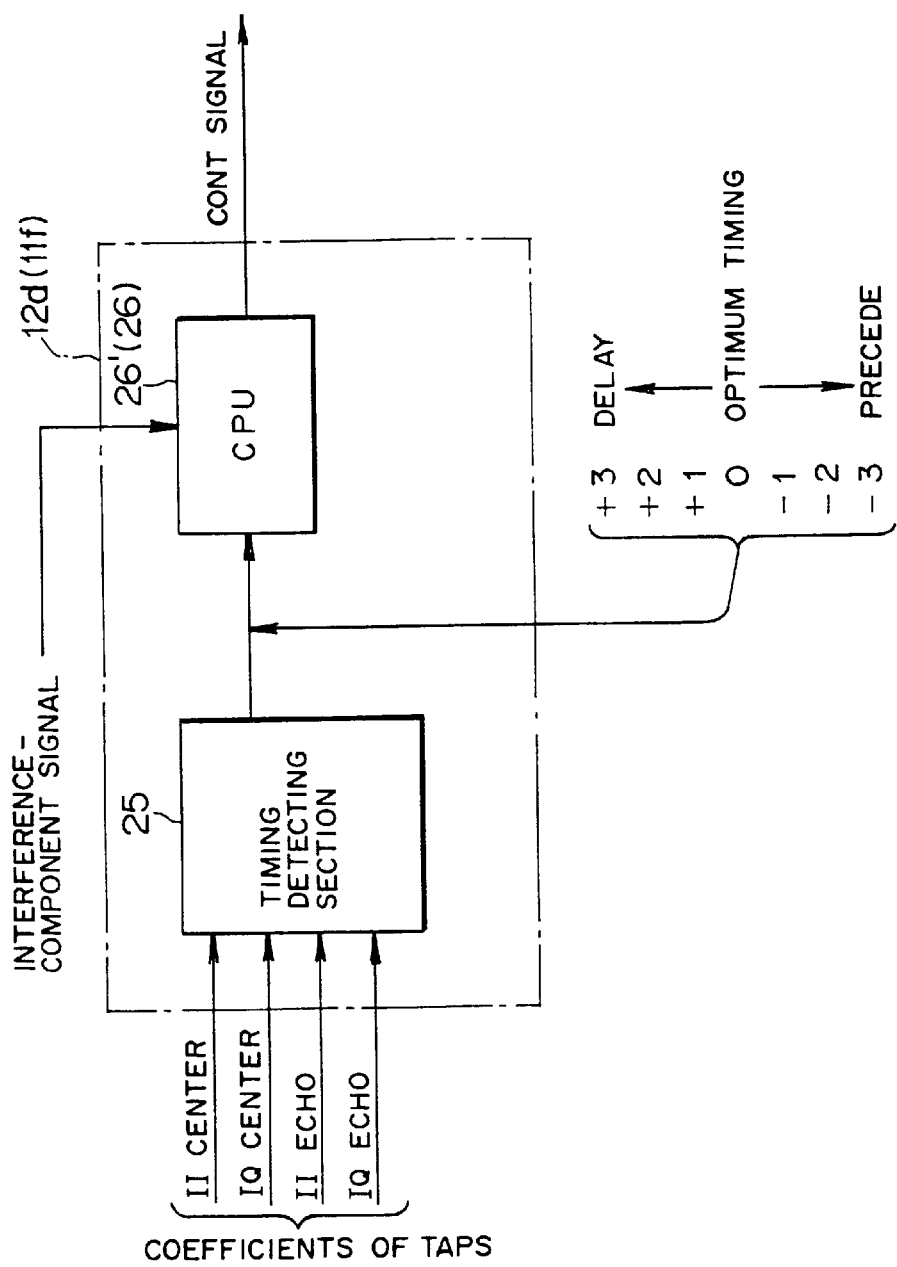
FIG. 5 illustrates the function of a controller of the present apparatus.

FIG. 5 shows the function of a controller 12d according to the present embodiment. The controller 12d of FIG. 5 includes a timing detecting section 25 and a control signal outputting section 26', and outputs the CONT signal based on the amount of polarization interference.

The timing detecting section 25 and the control signal outputting section 26' are dedicated for the I channel signal; the same timing detecting section and output signal control section dedicated for the Q channel signal are not illustrated but actually provided. The controller 11f of the signal demodulating section 11 (FIG. 1), the controller of the signal demodulating section 15 of the cross polarization interference eliminating apparatus 16 (not shown), and the controller of the interference eliminating section 14 (not shown) are individually identical with the controller 12d, except the way how the output CONT signals are used.

The timing detecting section 25 extracts an amount of cross polarization interference, based on the coefficients of taps in the transversal equalizer 12c, and outputs a value of the extracted amount as delay-amount information; the timing detecting section 25 receives information about the coefficients of taps (the tap coefficients) output from the transversal equalizer 12c and decodes the tap coefficient information to output an amount of delay or precedence of the-cross polarization interference eliminating apparatus. The amount of delay or precedence is expressed in terms of three bits, or the like; "+3" represents the most delayed status, and "−3" represents the most precedence status. Therefore the three bits designating "+3" through "−3" are allotted 011 to "+3"; 010 to "+2"; 001 to "+1"; 000 to "0"; 111 to "−1"; 110 to "−2"; and 101 to "−3".

The control signal outputting section 26' outputs a control signal to the demodulator 12b for the delay operation, based on the delay-amount information and a signal of the interference-component from outside the apparatus. Specifically, the output signal control section 26' converts a control signal of positive logic (a CONT signal) into a signal of negative logic, and outputs the converted signal when a delay is needed, based on the delay-amount information and the signal from interference-component from outside the apparatus. The control signal outputting section 26' a unitary form composed of a CPU 26 and a memory (not shown). The CPU 26 itself is well known, so its description is omitted here.

The interference-component signal is utilized to protect an interference eliminating operation free from error. Namely, if interference is void or little, the amount of delay is not exactly controlled for a remarkable large error of the coefficients of taps. Therefore the foregoing individual three-bit value is read and decoded to notify a required amount of delay of the subsequent processes in the form of the quantity of converting the CONT signal into negative logic. If the amount of interference is 000 or 111, the control signal outputting section 26' ensures an error-free interference eliminating operation without converting the logic of the CONT signal into negative logic and adjusts the amount of delay by the quantity of negative logic as describe above.

The occurrence of the interference is notified to a subsequent processing stage by the tap coefficient information output from the transversal equalizer 12c and the interference-component signal. Then the control signal outputting section 26' monitors whether interference has occurred or not. If no interference has occurred, the CONT signal keeps being output in positive logic, and if interference has occurred, which means a timing adjustment is required, the logic of the CONT signal is converted into negative logic to delay bits.

In the interference eliminating section 12 (FIG. 2), if no cross polarization interference has occurred, interference is eliminated at a normal timing using the CONT signal. And if cross polarization interference has occurred, the interference is eliminated by generating a predetermined amount of delay by the CONT signal. And the amount of interference is also detected in the timing detecting section 25, irrespective of the tap coefficients of transversal equalizer 12c.

In the signal demodulating section 11 (FIG. 2), the CONT signal output from the controller 11f is utilized to adjust the sampling timing of the analog-to-digital converter 11a. Namely, the result of detection by the timing detecting section 25 of the controller 11f is represented in terms of three-bit data. The timing detecting section 25 outputs "0"at the optimum timing, "+3"at delayed timing, and "−3" at preceded timing so that the three-bit data is inputted to the control signal outputting section 26' to be optimized, thus generating the CONT signal.

Figure 6:
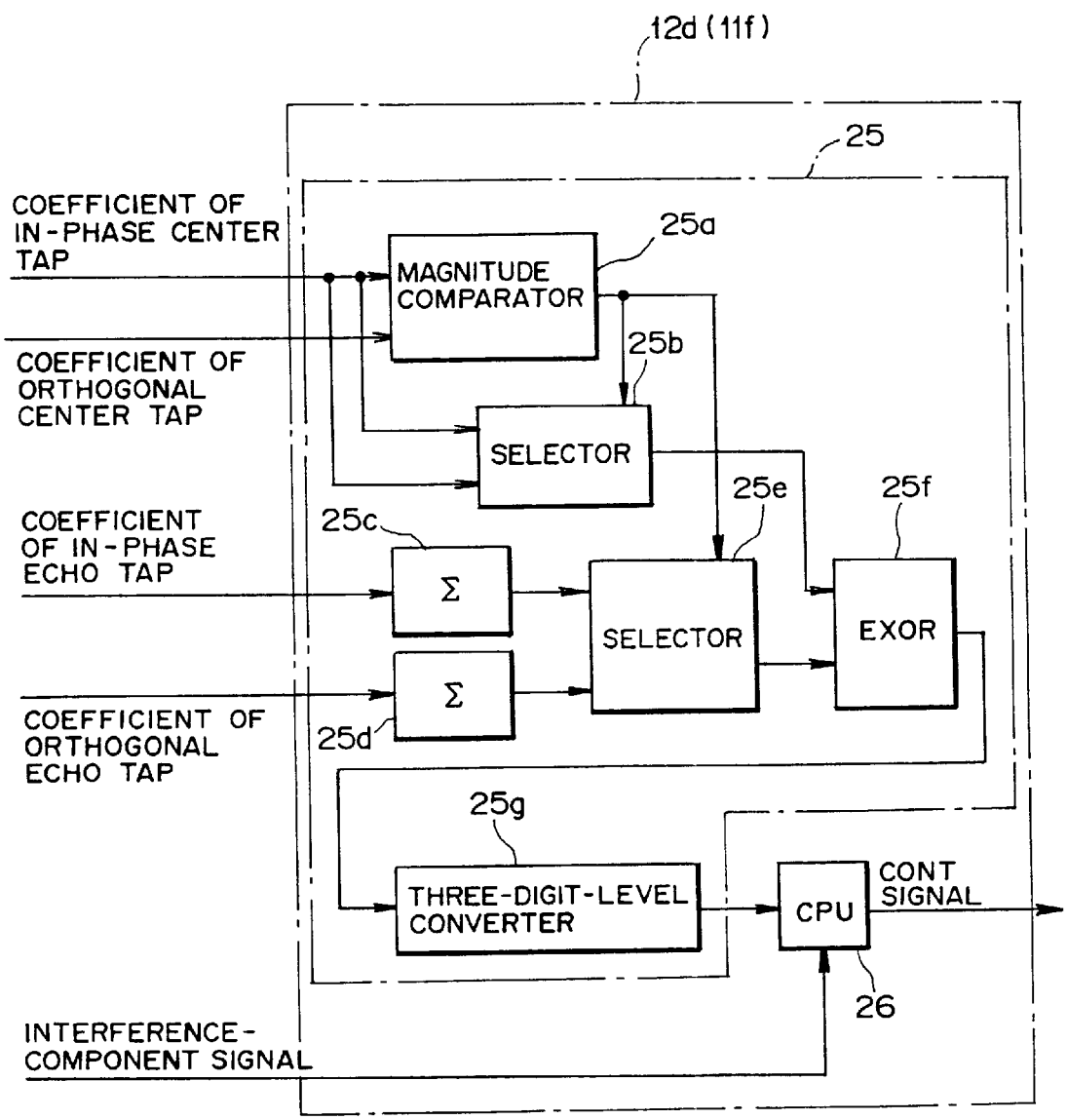
FIG. 6 is a block diagram showing a control section of the present apparatus.

FIG. 6 is a block diagram of the controller 12d according to the present embodiment, showing an example of the I channel of the timing detecting section 25 of FIG. 5. The timing detecting section 25 of the controller 12d is composed of a magnitude comparator 25a, a selector 25b, 25e, adders 25c, 25d, an EXOR calculator 25f, and a three-digit-level converter 25g.

The magnitude comparator 25a compares the coefficient of an in-phase center tap of the I channel with the coefficient of an orthogonal center tap of the I channel, and outputs the larger coefficient and the result of comparison, as switching signals, to later element. The coefficient of the in-phase center tap of the I channel is a coefficient of the tap located at the center of the correlation value calculating section 27a of the transversal equalizer 12c, and the coefficient of the orthogonal center tap of the I channel is a coefficient of the tap located at the center of the correlation value calculating section 27b of the transversal equalizer 12c.

The selector 25b selects either the coefficient of in-phase center tap of the I channel or the coefficient of orthogonal tap of the I channel, depending on the switching signal from the magnitude comparator 25a, and outputs the selected coefficient to a subsequent processing stage.

The adder 25c adds a plurality of coefficients of the in-phase echo taps, which coefficients are those of a plurality of taps located in both sides of the center tap in the correlation value calculating section 27a of the transversal equalizer 12c, and outputs the sum of these tap coefficients. Namely, the adder 25c adds coefficients of all the predetermined number of taps except for the center tap. And the predetermined number of taps is arbitrarily selected, so should by no means be limited to two, i.e. next to the center tap, and more than two taps may be selected.

The adder 25d adds a plurality of coefficients of the orthogonal echo taps, which coefficients are those of located in both sides of the center tap in the correlation value calculating section 27b of the transversal equalizer 12c, and outputs the sum of these tap coefficients. Namely, the adder 25d adds coefficients of all the predetermined number of taps except for the center tap. And the predetermined number of taps is arbitrarily selected, so should by no means be limited to two, i.e. next to the center tap, and more than two taps may be selected. The selector 25e selects either the coefficient of the adder 25c or the coefficient of the adder 25d, depending on the switching signal from the magnitude comparator 25a, and outputs the selected coefficient to a subsequent processing stage.

The EXOR calculator 25f outputs an exclusive logical sum between the outputs of the selector 25b and the selector 25e, and selects either the correlation value calculating section 27a or the correlation value calculating section 27b. Namely, if The EXOR calculator 25f selects the correlation value calculating section 27a, the coefficients of the in-phase center tap of the I channel and all the coefficients of a plurality of the in-phase echo taps of the I channel are added, and the total sum of the coefficients is outputted. And if the EXOR calculator 25f selects the correlation value calculating section 27b, the coefficients of the orthogonal center tap of the I channel and all the coefficients of a plurality of the orthogonal echo taps of the I channel are added, and the total sum of the coefficient is outputted.

The three-digit-level converter 25g converts a signal output from the EXOR calculator 25f into three-digit data to output seven kinds of signals, 000 through 111.

The function of each of magnitude comparator 25a, the selector 25b, 25e, the adder 25c, 25d, the EXOR calculator 25f and the three-digit-level converter 25 is realized by a logic circuit. The same description about the operation for the I channel is also applied for the Q channel.

The coefficient of the in-phase center tap of the I channel and the factor of the orthogonal center tap of the I channel are compared in the magnitude comparator 25a to output a switching signal to the selector 25b where either the coefficient of the in-phase center tap or the coefficient of the orthogonal center tap is selected, depending on the switching signal in the selector 25b. In addition, by the same signal, either the coefficient of the adder 25c or the coefficient of the adder 25d is outputted.

If the switching signal is for the coefficient of the in-phase center tap of the I channel and the coefficient of the orthogonal center tap of the I channel, the EXOR calculator 25f calculates an exclusive-or between the outputs of the selector 25b and the selector 25e, and outputs the result of the calculation. Otherwise, if the coefficient of the orthogonal center tap of the I channel and the coefficient of the orthogonal center tap of the I channel are selected, the EXOR calculator 25f calculates an exclusive disjunction between the outputs of the selector 25b and the selector 25e, and outputs the result of the calculation.

The output exclusive-or is outputted as one selected from seven kinds of signals, 000 through 111, by the three-digitvalue converter 25g. Subsequently, the CPU 26 verifies the seven kinds of signals along with the interference-component signal to control the CONT signal. The same description about the operation is also applied for the Q channel.

With the foregoing arrangement, digital signals are bit shifted to eliminate cross polarization interference-component caused from the signal demodulating section 11 and the interference eliminating section 12.

Figure 13:
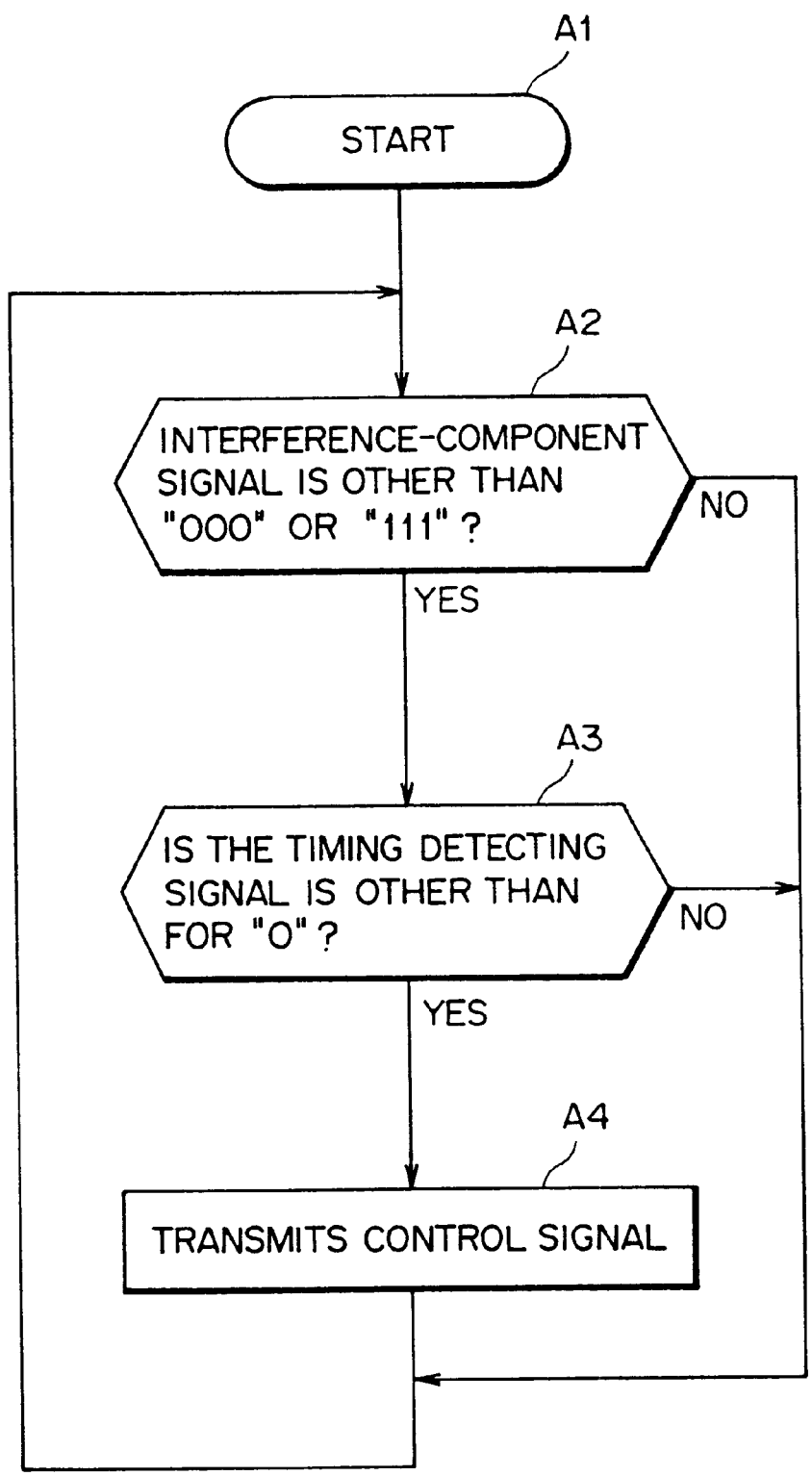
FIG. 13 is a flow chart illustrating the manner in which a-control signal outputting section of the present apparatus outputs a control signal.
Figure 14:
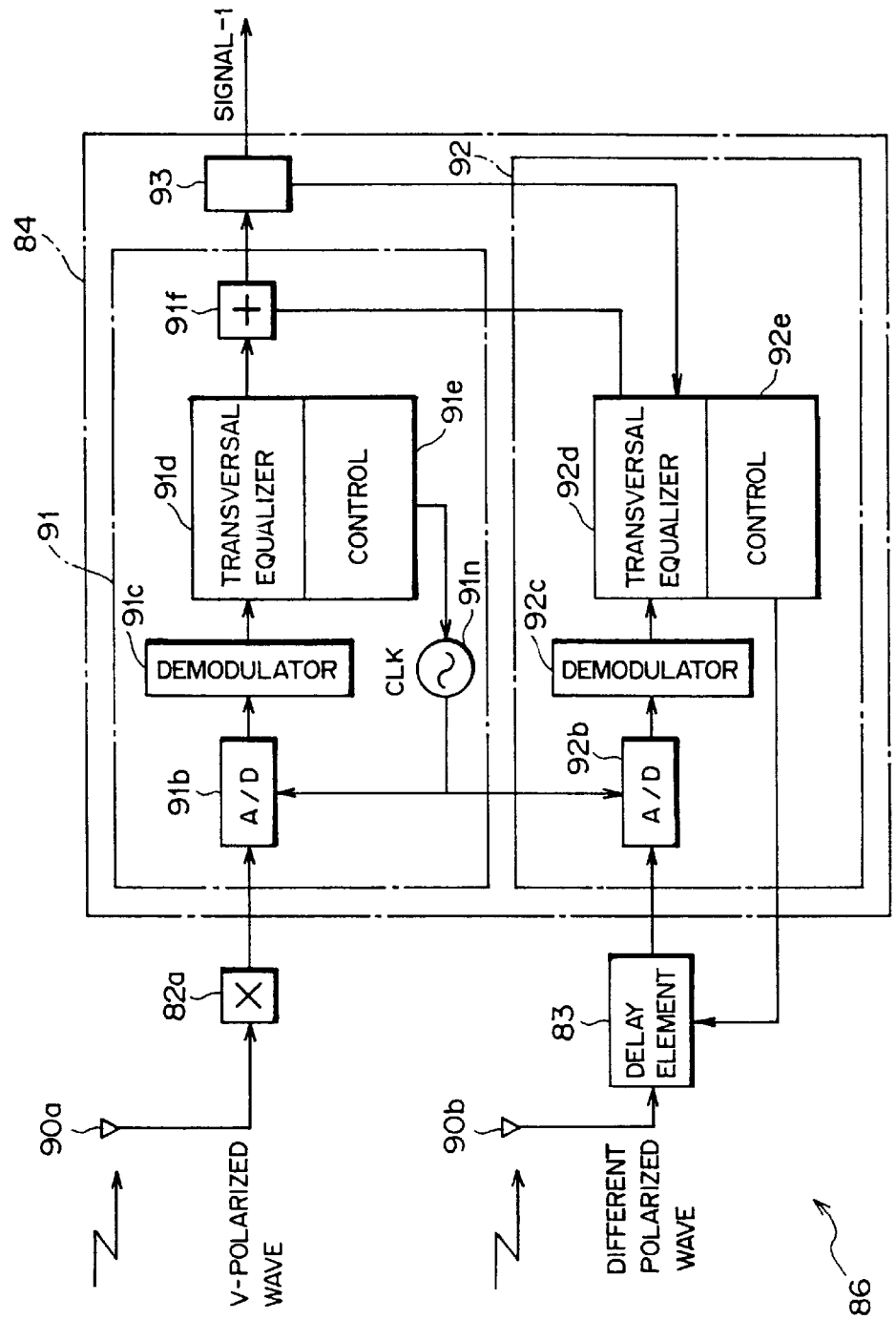
FIG. 14 is a diagram schematically showing the manner in which a cross polarized wave interference component is eliminated from one of received polarized waves.

FIG. 13 is a flow chart illustrating the function of the control signal outputting section 26' in terms of the operation of the CPU 26. The operation of the CPU 26 begins at step A1. At the subsequent step A2, the CPU 26 discriminates whether the interference-component signal is other than either of "000" and "111" or not; if the signal is other than either of "000" and "111", the YES route is taken to discriminates whether the timing detecting signal is other than "0" at step A3. Subsequently, if the timing detecting signal is other than "0" at step A3, the YES route is taken to transmit a CONT signal at step A4; the CONT signal controls to eliminate the interference-components.

Succeeding to step A4, bits are delayed by the CONT signal result in a bit-shift for eliminating cross polarization interference in synchronism with a multiplied clock equal to four times the demodulated baseband signal.

First, if the digital signal should not be delayed in step A4, which is correspond to a discriminating step for discriminating whether a digital signal should be delayed or not based on the amount of cross polarization interference, the CPU 26 outputs four kinds of binary digits synchronism with a multiplied clock and a low-speed clock synchronism with the demodulated baseband signal. Otherwise, if the digital signal should be delayed in step A4, the CPU 26 stops outputting four kinds of binary digits synchronism with a multiplied clock and a low-speed clock synchronism with the demodulated baseband signal in the discriminating step (passing and delaying step).

Further, the CPU 26 designates a particular holding portion, among the holding portions 22a, 22b, 22c, 22d in the first holding section 22 (designating step) and writes a binary digit of one bit digital signal synchronism with a multiplied clock into the particular holding portion designated in the designating step (first writing step). The digital signal referred herein represents the demodulated 4FDATA.

Subsequently, the CPU 26 writes binary digits of the holding portions, which constitute the first holding section 22, one into each of the four holding portions 23a, 23b, 23c, 23d of the second holding section 23 by the low-speed clock (second writing step) The CPU 26 also writes binary digits of the holding portions, which constitute the second holding section 23, one into each of the four holding portions 24a, 24b, 24c, 24d of the third holding section 24 may by the clock of the CONT signal (third writing step).

By controlling pulse of the CONT signal, it is possible to select the data for converting the bit array. By controlling the quantity of the negative logic of the CONT signal caused from the CPU 26, as mentioned above, it is possible to generate a bit delay of the predetermined time for delay of digital signal.

Further, because the amount of delay or precede is adjusted according to the delay of the digital signal and the amount of interference of the signal demodulating section 11 (15) in the real time, the amount of delay can be changed without a cell breathing while the system is working. Furthermore, it is possible to change the operation even while system is working without assistance by an operator, fine adjustments can be realized. Also it is possible to set the amount of delay, regardless of the change of environment, such as temperature.

Because digital signals inputted into the signal demodulating section 11 (15) is adjusted to be synchronism with digital signals inputted into the interference eliminating section 12 (14), it is possible to facilitate eliminating the interference-component.

With the thus simple digital apparatus, since the amount of delay can be controlled, it is possible to realize labor-free adjustments and reduction of apparatus to a compact size as well as stabilized operation. Additionally, since the apparatus does require only a reasonable amount of investment for manufacturing, it is possible to promote introduction of the present system.

(B) Modification of the Embodiment

The present invention should by no means be limited to the illustrated embodiment, and various other changes or modifications may be suggested without departing the gist of the inventive concept.

For example, in the foregoing embodiment, the present invention is applied to the receiving apparatus 20 that is adapted to process radio signals received from the transmitting apparatus 30. Alternatively, the present invention may be applied to a communications system composed of the transmitting apparatus 30 and the receiving apparatus 20, which are wirelessly connected to each other.

The logic value used in the foregoing embodiment is just one illustrated example. Alternatively, the logic values may be other values as demands arise in designing.

For example, in this embodiment, n, the clock speed, is four (4). In the alternations, n may be eight (8) sixteen (16) or others according to the demodulating method. And according to the embodiment, the amount of a bit delay is three bit; in alternations, one, two or the more bit may be delayed.

The control signal of the present invention referred as a CONT signal is identical with the CONTROL signal depicted in FIG. 13.

What is claimed is:

1. An apparatus for eliminating interference of cross polarization, comprising:

a signal demodulating section for receiving a first signal resulting from one of radio signals, which are transmitted in a modulated and encoded form respectively using two kinds of polarized plane waves intercrossing at right angles in a common frequency band, and for analog-to-digital converting, demodulating and equalizing the received first signal to output a first baseband signal;

an interference eliminating section for receiving a second signal resulting from the other radio signal, analog-to-digital converting the received second signal to obtain a digital signal, delaying the obtained digital signal by a predetermined time, and demodulating and equalizing the resulting digital signal to output a second baseband signal; and an adding section for adding the second baseband signal from said interference eliminating section to the first baseband signal from said signal demodulating section to output a composite signal;

said interference eliminating section including:

analog-to-digital converter for converting the second signal to output a digital signal;

a demodulator, connected to said analog-to-digital converter, for delaying the digital signal from said analog-to-digital converter by said predetermined time;

an equalizer, connected to said demodulator, for equalizing the digital signal from said demodulator, and for extracting an amount of interference of cross polarization, said equalizer having a plurality of taps whose coefficients are variable for outputting of the second baseband signal;

a controller, connected to said equalizer, for reading/writing the coefficients of said taps in said equalizer and outputting an amount of delay or precedence according to the amount of interference of cross polarization extracted in said equalizer as well as a control signal indicating an activation command or an inactivation command, about a baseband signal represented by the digital signal outputted from said analog-to-digital converter; and a timing adjuster, connected to said controller and said demodulator, for setting a delay time in said demodulator in accordance with said control signal from said controller.

2. An apparatus for eliminating interference of cross polarization, comprising:

a signal demodulating section for receiving a first signal resulting from one of radio signals, which are transmitted in a modulated and encoded form respectively using two kinds of polarized plane waves intercrossing at right angles in a common frequency band, and for analog-to-digital converting, demodulating and equalizing the received first signal to output a first baseband signal;

an interference eliminating section for receiving a second signal resulting from the other radio signal, analog-to-digital converting the received second signal to obtain a digital signal, delaying the obtained digital signal by a predetermined time, and demodulating and equalizing the resulting digital signal to output a second baseband signal; and an adding section for adding the second baseband signal from said interference eliminating section to the first baseband signal from said signal demodulating section to output a composite signal;

said interference eliminating section including an analog-to-digital converter for converting the second signal to output a digital signal;

demodulator, connected to said analog-to-digital converter, for delaying the digital signal from said analog-to-digital converter by said predetermined time;

an equalizer, connected to said demodulator, for equalizing the digital signal from said demodulator, said equalizer having a plurality of taps whose coefficients are variable for outputting of the second baseband signal;

a controller, connected to said equalizer, for reading/writing the coefficients of said taps in said equalizer and outputting a control signal to the outside of said controller, and a timing adjuster, connected to said controller and said demodulator, for setting a delay time in said demodulator in accordance with said control signal from said controller, wherein said timing adjuster includes a counter, connected to said controller, for outputting n kinds of binary signals, which are synchronized with a high-speed clock equal to n times a clock speed of the demodulated signal, and a low-speed clock, which is synchronized with the clock speed of the demodulated signal, where n is a natural number, and a decoder, connected to said counter and having n output lines, for inputting to said demodulator binary digits of said n output lines in synchronism with said high-speed clock in such a manner that the binary digit of only one of said n output lines is different from the binary digits of the remaining output lines in correspondence to said n kinds of binary signals from said counter; and wherein if said control signal is an activation command, the binary digits of said n output lines in said decoder are updated, and if said control signal is an inactivation command, the binary digits of said n output lines in said decoder are not updated.

3. An apparatus for eliminating interference of cross polarization, comprising:

a signal demodulating section for receiving a first signal resulting from one of radio signals, which are transmitted in a modulated and encoded form respectively using two kinds of polarized plane waves intercrossing at right angles in a common frequency band, and for analog-to-digital converting, demodulating and equalizing the received first signal to output a first baseband signal;

an interference eliminating section for receiving a second signal resulting from the other radio signal, analog-to-digital converting the received second signal to obtain a digital signal, delaying the obtained digital signal by a predetermined time, and demodulating and equalizing the resulting digital signal to output a second baseband signal; and an adding section for adding the second baseband signal from said interference eliminating section to the first baseband signal from said signal demodulating section to output a composite signal;

said interference eliminating section including an analog-to-digital converter for converting the second signal to output a digital signal;

demodulator, connected to said analog-to-digital converter, for delaying the digital signal from said analog-to-digital converter by said predetermined time;

an equalizer, connected to said demodulator, for equalizing the digital signal from said demodulator, said equalizer having a plurality of taps whose coefficients are variable for outputting of the second baseband signal;

a controller, connected to said equalizer, for reading/writing the coefficients of said taps in said equalizer and outputting a control signal to the outside of said controller, and a timing adjuster, connected to said controller and said demodulator, for setting a delay time in said demodulator in accordance with said control signal from said controller, wherein said timing adjuster includes an output unit for outputting binary digits of n output lines, which are synchronized with a high-speed clock equal to n times a clock speed of the demodulated signal, in such a manner that the binary digit of only one of said n output lines are different from the binary digits of the remaining output lines, where n is a natural number, and a clock generator for outputting a low-speed clock, which is synchronism with a clock speed of the demodulated signal; and wherein if said control signal is an activation command, the binary digits of said n output lines in said output unit are updated, and if said control signal is an activation command, the binary digits of said n output lines in said output unit are not updated.

4. An apparatus according to claim 2, wherein said demodulator has:
  a first holding sections, connected to said analog-to-digital converter and said timing adjuster, for rewriting holding portions corresponding to said n output lines from said timing adjuster into a value of the demodulated signal to output binary digits of n bits;
  a second holding section, connected to said first holding section and said counter in said timing adjuster, for storing said binary digits of n bits from said first holding section in synchronism with said low-speed clock from said counter; and
  a third holding section, connected to said second holding section, for storing said binary digits of n bits, which are stored in said second holding section, at a clock speed synchronized with the clock speed of the demodulated signal to be inputted from the outside of said third holding section.

5. An apparatus according to claim 3, wherein said demodulator has:
  a first holding section, connected to said analog-to-digital converter and said timing adjuster, for rewriting holding portions corresponding to said n output lines from said timing adjuster into a value of the demodulated signal to output binary digits of n bits;
  a second holding section, connected to said first holding section and said counter in said timing adjuster, for storing said binary digits of n bits from said first holding section in synchronism with said low-speed clock from said counter; and
  a third holding section, connected to said second holding section, for storing said binary digits of n bits, which are stored in said second holding section, at a clock speed synchronized with the clock speed of the demodulated signal to be input from the outside of said third holding section.

6. An apparatus for eliminating interference of cross polarization, comprising:
  a signal demodulating section for receiving a first signal resulting from one of radio signals, which are transmitted in a modulated and encoded form respectively using two kinds of polarized plane waves intercrossing at right angles in a common frequency band, and for analog-to-digital converting, demodulating and equalizing the received first signal to output a first baseband signal;
  an interference eliminating section for receiving a second signal resulting from the other radio signal, analog-to-digital converting the received second signal to obtain a digital signal, delaying the obtained digital signal by a predetermined time, and
  demodulating and equalizing the resulting digital signal to output a second baseband signal; and
  an adding section for adding the second baseband signal from said interference eliminating section to the first baseband signal from said signal demodulating section to output a composite signal;
  said interference eliminating section including
    an analog-to-digital converter for converting the second signal to output a digital signal;
    demodulator, connected to said analog-to-digital converter, for delaying the digital signal from said analog-to-digital converter by said predetermined time;
    an equalizer, connected to said demodulator, for equalizing the digital signal from said demodulator, said equalizer having a plurality of taps whose coefficients are variable for outputting of the second baseband signal;
    a controller, connected to said equalizer, for reading/writing the coefficients of said taps in said equalizer and outputting a control signal to the outside of said controller, and
    a timing adjuster, connected to said controller and said demodulator, for setting a delay time in said demodulator in accordance with said control signal from said controller,
  wherein said controller has:
    a timing detector for extracting an amount of interference of cross polarization, based on the coefficients of said taps in said equalizer and outputting a value of the extracted amount as amount-of-delay information; and
    a control-signal output device for outputting said control signal to activate said demodulator to delay, based on said amount-of-delay information from said timing detector and an interference-component signal from the outside of said control-signal output device.

* * * * *